(12) United States Patent
Huang et al.

(10) Patent No.: US 9,051,762 B2
(45) Date of Patent: Jun. 9, 2015

(54) TRANSMISSION MECHANISM ADAPTED TO AN ELECTRO-MECHANICAL LOCK AND ELECTRO-MECHANICAL LOCK THEREWITH

(71) Applicant: TAIWAN FU HSING INDUSTRIAL CO., LTD., Kaohsiung (TW)

(72) Inventors: Lien-Hsi Huang, Kaohsiung (TW); Jian-Yuan Huang, Kaohsiung (TW)

(73) Assignee: TAIWAN FU HSING INDUSTRIAL CO., LTD., Gangshan District, Kaohsiung (TW)

( * ) Notice: Subject to any disclaimer, the term of this patent is extended or adjusted under 35 U.S.C. 154(b) by 92 days.

(21) Appl. No.: 13/726,600

(22) Filed: Dec. 25, 2012

(65) Prior Publication Data
US 2013/0167598 A1 Jul. 4, 2013

(30) Foreign Application Priority Data
Dec. 29, 2011 (TW) .............................. 100149523 A

(51) Int. Cl.
| | |
|---|---|
| *E05B 13/10* | (2006.01) |
| *E05B 47/06* | (2006.01) |
| *E05B 49/00* | (2006.01) |
| *F16H 19/02* | (2006.01) |
| *E05B 47/00* | (2006.01) |
| *E05B 63/04* | (2006.01) |

(52) U.S. Cl.
CPC ............ *E05B 47/068* (2013.01); *E05B 47/0001* (2013.01); *E05B 49/00* (2013.01); *F16H 19/02* (2013.01); *Y10T 74/18056* (2015.01); *E05B 2047/0026* (2013.01); *E05B 47/0012* (2013.01); *E05B 63/04* (2013.01); *E05B 13/101* (2013.01); *E05B 2047/002* (2013.01); *E05B 2047/0031* (2013.01)

(58) Field of Classification Search
CPC ... E05B 13/005; E05B 47/00; E05B 47/0001; E05B 47/0012; E05B 47/0603; E05B 47/0607; E05B 47/0638; E05B 47/0642; E05B 47/0676; E05B 47/068; E05B 55/06; E05B 2047/0001; E05B 2047/0012; E05B 2047/0024; E05B 2047/0025; E05B 2047/0026; E05B 2047/0028; E05B 2047/003
USPC ........... 70/149, 218, 222, 223, 224, 422, 472, 70/277, 278.1, 278.7, 279.1, 280, 281, 70/282, 283
See application file for complete search history.

(56) References Cited

U.S. PATENT DOCUMENTS

| | | | |
|---|---|---|---|
| 6,517,127 B1 * | 2/2003 | Lu et al. ........................ | 292/144 |
| 7,543,469 B1 * | 6/2009 | Tseng et al. .................... | 70/472 |
| 7,770,423 B2 * | 8/2010 | Wu ................................ | 70/218 |

(Continued)

*Primary Examiner* — Christopher Boswell
(74) *Attorney, Agent, or Firm* — Winston Hsu; Scott Margo

(57) ABSTRACT

A transmission mechanism adapted to an electro-mechanical lock and for driving a latch assembly to be unlocked is disclosed. The transmission mechanism includes a bottom board, a pushing member, a clutch member and an electro-actuating member. The bottom board includes at least one first pushed structure. The pushing member includes at least one second pushed structure. The clutch member abuts against the pushing member. The electro-actuating member is for driving the pushing member to rotate toward a first direction. The at least one second pushed structure cooperates with the at least one first pushed structure to move the pushing member relative to the bottom board, so that the clutch member is pushed with movement of the pushing member to an unlocked position.

16 Claims, 27 Drawing Sheets

(56) References Cited

U.S. PATENT DOCUMENTS

| | | | |
|---|---|---|---|
| 7,827,837 B2 * | 11/2010 | Huang et al. | 70/277 |
| 2003/0209043 A1 * | 11/2003 | Yeh et al. | 70/280 |
| 2004/0177660 A1 * | 9/2004 | Tsai | 70/223 |
| 2004/0207214 A1 * | 10/2004 | Lin | 292/336.3 |
| 2009/0211320 A1 * | 8/2009 | Wu | 70/277 |

* cited by examiner

TRANSMISSION MECHANISM ADAPTED TO AN ELECTRO-MECHANICAL LOCK AND ELECTRO-MECHANICAL LOCK THEREWITH

BACKGROUND OF THE INVENTION

1. Field of the Invention

The present invention relates to a transmission mechanism adapted to an electro-mechanical lock and an electro-mechanical lock therewith, and more particularly, to a transmission mechanism for driving the latch assembly to be in an unlocked status and an electro-mechanical lock therewith.

2. Description of the Prior Art

Generally speaking, an electro-mechanical lock utilizes a gear transmission mechanism to transmit a torsion torque outputted by a motor, so as to drive a clutch mechanism of the electro-mechanical lock to engage with or disengage from a latch assembly. When the gear transmission mechanism is forwardly driven by the motor, a pushed structure on the gear transmission mechanism can drive the clutch mechanism to engage with the latch assembly of the electro-mechanical lock. Accordingly, a torsion torque exerted by a handle can be transmitted to the latch assembly, so that a user can open the door by rotating the handle. When the gear transmission mechanism is reversely driven by the motor, a spring can drive the clutch mechanism to disengage from the latch assembly of the electro-mechanical lock. Thus, the torsion torque exerted by the handle cannot be transmitted to the latch assembly, so that the latch assembly can keep in a locked status.

However, the conventional pushed structure for driving the clutch mechanism is disposed on the gear transmission mechanism. It results in structural complexity of the gear transmission mechanism and disadvantages of assembly. Moreover, when the gear transmission mechanism drives the clutch mechanism, the gear transmission mechanism is also exerted by a reaction force applied by the clutch mechanism, resulting in that the gear transmission mechanism is easily worn. As a result, it reduces life of the electro-mechanical lock and thus disadvantages the electro-mechanical lock in the market.

SUMMARY OF THE INVENTION

The present invention provides a transmission mechanism for driving the latch assembly to be in an unlocked status and an electro-mechanical lock therewith for solving above drawbacks.

The present invention discloses a transmission mechanism adapted to an electro-mechanical lock and for driving a latch assembly to be unlocked. The transmission mechanism includes a bottom board, a pushing member, a clutch member and an electro-actuating member. The bottom board includes at least one first pushed structure. The pushing member includes at least one second pushed structure. The clutch member abuts against the pushing member. The electro-actuating member is for driving the pushing member to rotate toward a first direction. The at least one second pushed structure cooperates with the at least one first pushed structure to move the pushing member relative to the bottom board, so that the clutch member is pushed with movement of the pushing member to an unlocked position.

The present invention further discloses an electro-mechanical lock fixed on a door. The electro-mechanical lock includes a transmission mechanism and a handle device. The transmission mechanism includes a bottom board and a pushing member. The bottom board is screwed onto the door. The pushing member abuts against the bottom board and is movable relative to the bottom board. The handle device is rotable relative to a long axis. The pushing member moves to an unlocked position along a first movement direction of the long axis far away from the bottom board when the pushing member pushes the bottom board, so that the handle device transmits a torsion force. The pushing member moves from the unlocked position along a second movement direction of the long axis close to the bottom board when the pushing member does not push the bottom board, so that the handle device can not transmit the torsion force.

In summary, when the electro-actuating member (e.g. a motor) drives the pushing member to rotate toward the first direction, the second pushed structure on the pushing member cooperates with the first pushed structure on the bottom board, so that the pushing member is pushed to move relative to the bottom board. In such a manner, by design that the first pushed structure and the second pushed structure for driving the clutch member are respectively disposed on the bottom board and the pushing member, the present invention can reduce structural complexity of the pushing member, so as to facilitate assembly, In addition, when the electro-actuating member drives the pushing member, the present invention utilizes the bottom board to provide a reaction force required to push the clutch member. Since the bottom board can be fixed on a door, the present invention can reduce wearing by increasingly improve stability of mechanism when functioning. As a result, it enhances life of the electro-mechanical lock and thus advantages the electro-mechanical lock in the market.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
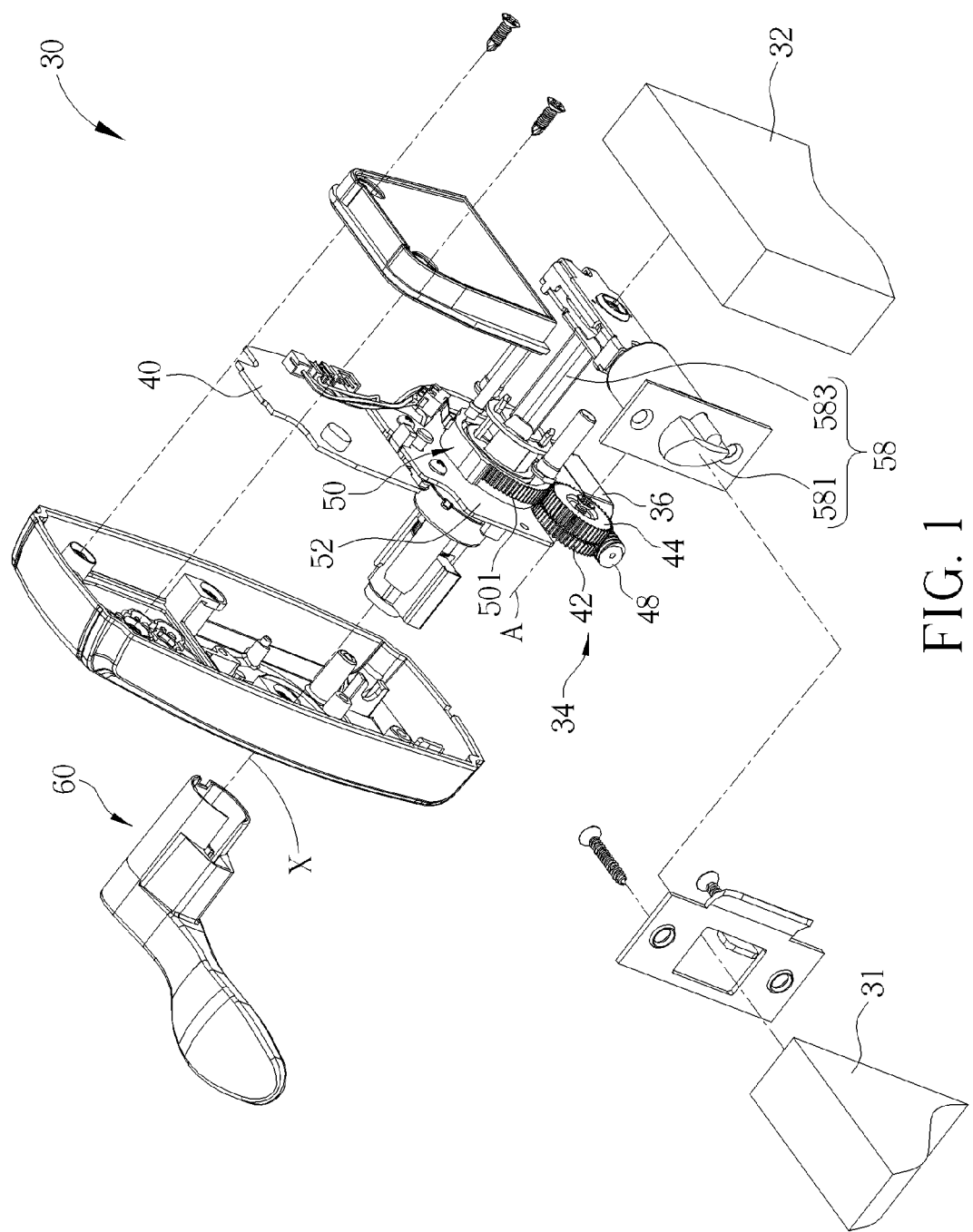
FIG. 1 is a diagram of an electro-mechanical lock according to an embodiment of the present invention.
Figure 2:
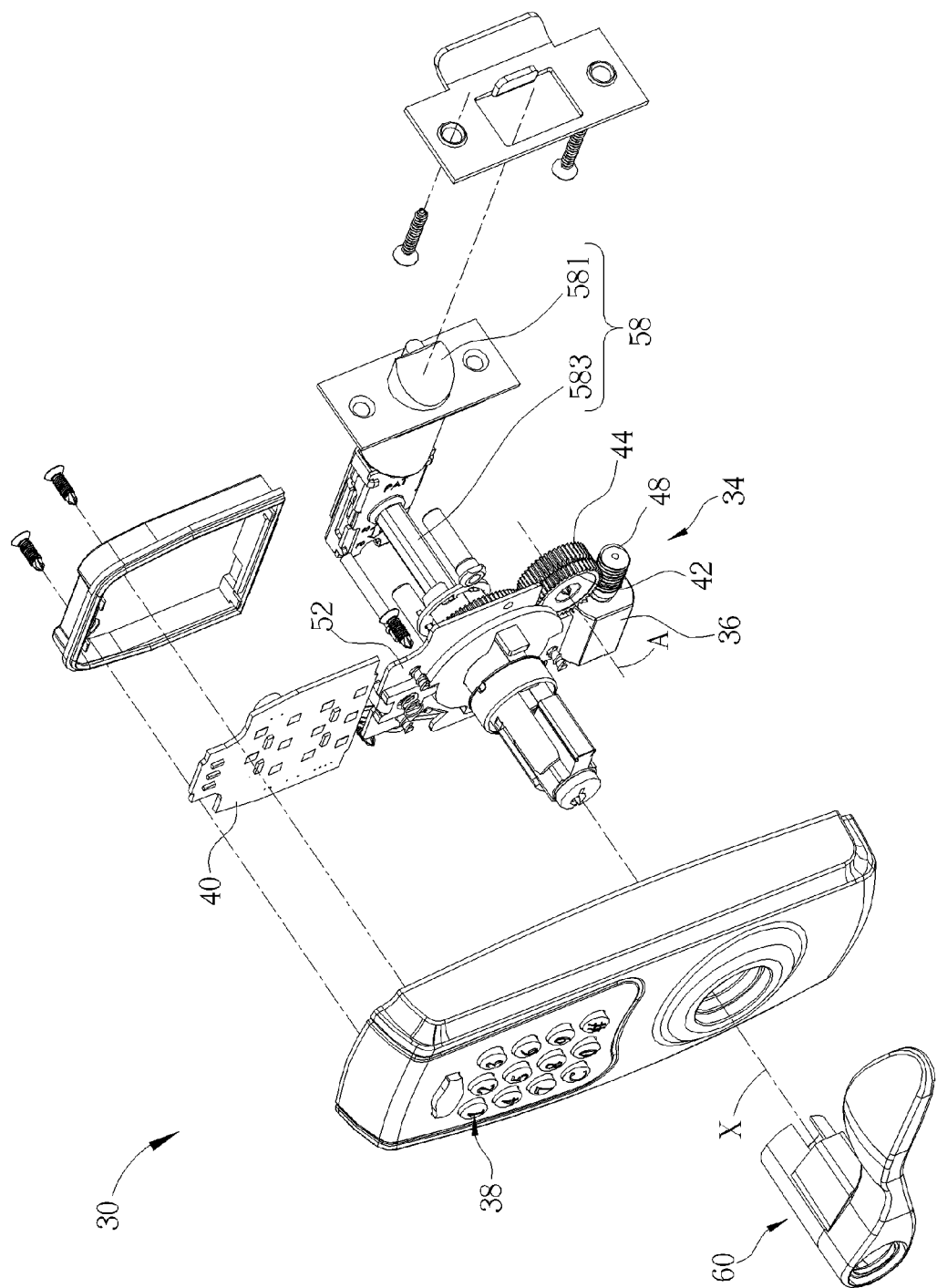
FIG. 2 is a diagram of the electro-mechanical lock at another viewing angle.

Please refer to FIG. 1, which is a diagram of an electro-mechanical lock 30 according to an embodiment of the present invention. As shown in FIG. 1, the electro-mechanical lock 30 could be installed on a door 32 for locking the door 32 onto a wall 31 or for unlocking the door 32 from the wall 31, so that the door 32 could be correspondingly in a locked status or an unlocked status. Please refer to FIG. 1 and FIG. 2. FIG. 2 is a diagram of the electro-mechanical lock 30 at another viewing angle. As shown in FIG. 1 and FIG. 2, the electro-mechanical lock 30 includes a transmission mechanism 34. The transmission mechanism 34 includes an electro-actuating member 36. The electro-actuating member 36 is used as the power source of the electro-mechanical lock 30. Furthermore, the electro-mechanical lock 30 further includes an input unit 38 for inputting a signal, such as a password signal. In this embodiment, the input unit 38 could be a button device, but not limited thereto. For example, the input unit 38 could also be a touch panel. In other words, all input units capable of inputting the signal could be utilized by the present invention.

It should be mentioned that the electro-mechanical lock 30 further includes a control unit 40 coupled to the input unit 38 and the electro-actuating member 36. When a user wants to unlock the door 32, the user just needs to utilize the input unit 38 to input the signal into the control unit 40. Subsequently, when the signal inputted by the input unit 38 conforms to an authorized signal, the control unit 40 controls the electro-actuating member 36 to drive the transmission mechanism 34 to perform the following operations (e.g. unlocking the door 32). Furthermore, the transmission mechanism 34 further includes a first rotating wheel 42 and a second rotating wheel 44. The first rotating wheel 42 is used for transmitting a torsion force outputted by the electro-actuating member 36. The first rotating wheel 42 has an axial direction A, and the second rotating wheel 44 is arranged adjacent to the first rotating wheel 42 in the axial direction A, so that the torsion force outputted by the electro-actuating member 36 could be transmitted between the first rotating wheel 42 and the second rotating wheel 44 along the axial direction A.

Figure 3:
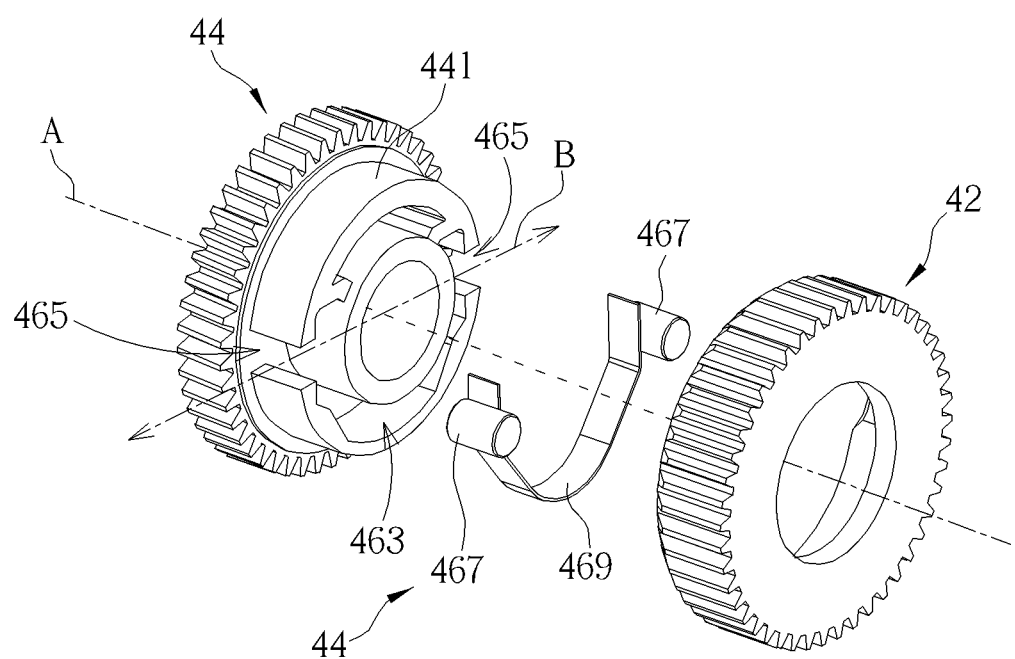
FIG. 3 is an exploded diagram of a first rotating wheel and a second rotating wheel according to an embodiment of the present invention.
Figure 4:
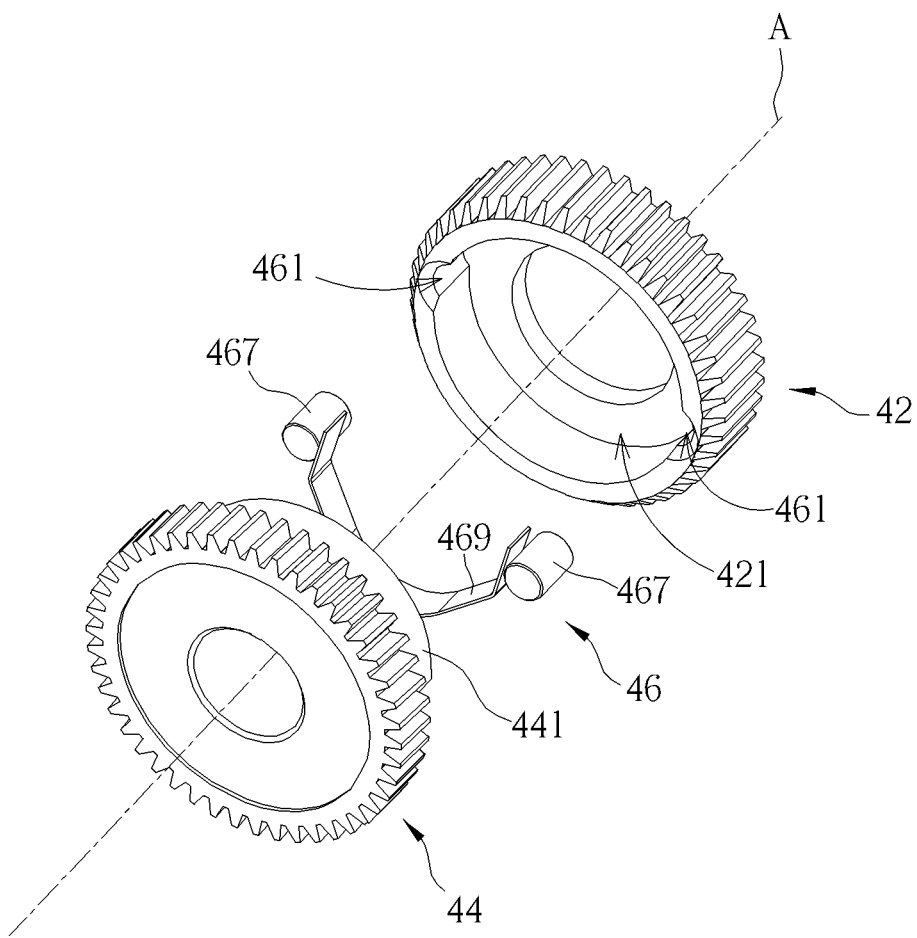
FIG. 4 is an exploded diagram of the first rotating wheel and the second rotating wheel in FIG. 3 at another viewing angle.
Figure 5:
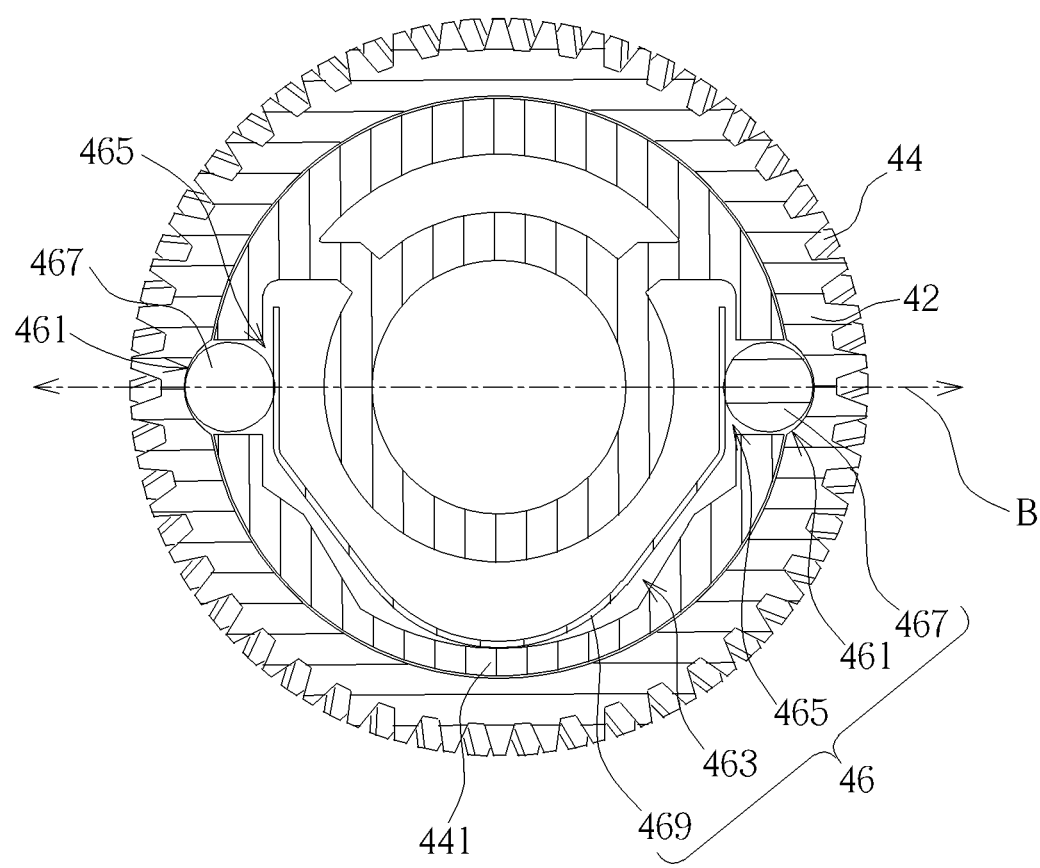
FIG. 5 is a sectional diagram of the first rotating wheel, the second rotating wheel, and an interference mechanism according to an embodiment of the present invention.

Please refer to FIG. 3 and FIG. 4. FIG. 3 is an exploded diagram of the first rotating wheel 42 and the second rotating wheel 44 according to an embodiment of the present invention. FIG. 4 is an exploded diagram of the first rotating wheel 42 and the second rotating wheel 44 in FIG. 3 at another viewing angle. As shown in FIG. 3 and FIG. 4, the first rotating wheel 42 has a rotating concave portion 421, and the second rotating wheel 44 has a rotating shaft portion 441. The rotating shaft portion 441 is rotatably disposed in the rotating concave portion 421. The transmission mechanism 34 further includes an interference mechanism 46 disposed between the first rotating wheel 42 and the second rotating wheel 44. In this embodiment, the interference mechanism 46 includes two engaging slots 461 and a containing slot 463. Each engaging slot 461 is formed on a periphery of the rotating concave portion 421 of the first rotating wheel 42 and has an arc-shaped concave surface. The containing slot 463 is formed on an end surface of the rotating shaft portion 441 of the second rotating wheel 44. Please refer to FIG. 5, which is a sectional diagram of the first rotating wheel 42, the second rotating wheel 44, and the interference mechanism 46 according to an embodiment of the present invention. As shown in FIG. 5, after the first rotating wheel 42, the second rotating wheel 44, and the interference mechanism 46 are assembled along the axial direction A of the rotating shaft portion 441, the interference mechanism 46 could be disposed between the first rotating wheel 42 and the second rotating wheel 44 and the containing slot 463 could be located at the inner side of the each engaging slot 461. Furthermore, the containing slot 463 has two openings 465 formed along a radial direction B perpendicular to the axial direction A.

Moreover, the interference mechanism 46 further includes two engaging members 467 and an elastic member 469. Each engaging member 467 has an arc-shaped convex surface. Each engaging member 467 is located in the containing slot 463 and detachably engaged with the engaging slot 461. The elastic member 469 is disposed in the containing slot 463. To be noted, when the elastic member 469 is disposed in the containing slot 463, the elastic member 469 is compressed by the engaging member 467 since the engaging member 467 occupies partial space of the containing slot 463. Thus, the elastic member 469 could provide each engaging member 467 with an elastic force to respectively push each engaging member 467 to move outward. In such a manner, the arc-shaped convex surface of each engaging member 467 could be engaged with the corresponding engaging slot 461 by contacting with the arc-shaped concave surface of the corresponding engaging slot 461 via the opening 465 respectively (as shown in FIG. 5). As a result, the first rotating wheel 42 and the second rotating wheel 44 could be interfered with each other by each engaging member 467, so as to make the torsion force outputted by the electro-actuating member 36 capable of being transmitted between the first rotating wheel 42 and the second rotating wheel 44 along the axial direction A of the first rotating wheel 42. In this embodiment, the elastic member 46 is a C-shaped elastic sheet, the containing slot 463 is a C-shaped concave slot, and the two ends of the C-shaped elastic sheet abut against each engaging member 467 in the radial direction B respectively. In practical application, each engaging member 467 could be a rolling pillar structure, and each engaging slot 461 could be correspondingly a semi-cylindrical concave slot (as shown in FIG. 3 and FIG. 4).

The number of the engaging slots 461 and the engaging members 467 is not limited to this embodiment. For example, the interference mechanism 46 could only include one engaging member 467 and one corresponding engaging slot 461. In another embodiment, the interference mechanism 46 could include two elastic members 469 and two corresponding containing slots 463. Each elastic member 469 is disposed in the corresponding containing slot 463, and two ends of each elastic member 469 abut against the corresponding engaging member 467 respectively. In other words, the interference mechanism 46 could also include four engaging members 467 and four corresponding engaging slots 461, meaning that the interference 46 of the present invention includes at least one engaging slot 461, at least one containing slot 463, at least one engaging member 467, and at least one elastic member 469. That is, all designs of utilizing at least one engaging slot 461, at least one containing slot 463, at least one engaging member 467, and at least one elastic member 469 to make the first rotating wheel 42 and the second rotating wheel 44 capable of interfering with each other and then rotating simultaneously may fall within the scope of the present invention.

Furthermore, the transmission mechanism 34 has a worm gear 48 connected to the electro-actuating member 36 for transmitting the torsion force outputted by the electro-actuating member 36 to the first rotating wheel 42 (as shown in FIG. 1 and FIG. 2). In practical application, the electro-actuating member 36 could be a motor, such as a direct current motor. The first rotating wheel 42 could be a bevel gear corresponding to the tooth shape of the worm gear 48 for engaging with the worm gear 48 to transmit the torsion force outputted by the electro-actuating member 36. The transmission mechanism 34 further includes a pushing member 50. In this embodiment, the pushing member 50 has a transmission gear portion 501 for engaging with the second rotating wheel 44, and the second rotating wheel 44 could be a spur gear. In such a manner, the torsion force outputted by the electro-actuating member 36 could be transmitted to the first rotating wheel 42 and then transmitted to the second rotating wheel 44 via the interference mechanism 46. Finally, the torsion force could be transmitted to the pushing member 50 via the second rotating wheel 44.

In summary, when the electro-actuating member 36 drives the pushing member 50, the first rotating member 42 could receive the torsion force outputted by the electro-actuating member 36 and the second rotating wheel 44 could receive the torsion force caused by the inner friction forces of the other inner components (e.g. the pushing member 50) of the electro-mechanical lock 30. At this time, the elastic member 469 could drive each engaging member 467 in the radial direction B to be engaged with the corresponding engaging slot 461 via the corresponding opening 465, so that the first rotating wheel 42 could be engaged with the second rotating wheel 44. Thus, the electro-actuating member 36 could drive the first rotating wheel and the second rotating wheel 44 to rotate simultaneously. Accordingly, the torsion force outputted by the electro-actuating member 36 could be transmitted to the pushing member 50 via the worm gear 48, the first rotating wheel 42 and the second rotating wheel 44 sequentially, so that the pushing member 50 could be driven to rotate.

On the other hand, if malfunction of the transmission mechanism 34 occurs, it may make the second rotating wheel 44 incapable of rotating (commonly known as "jamming"). In this condition, each engaging member 467 could be easily disengaged from the corresponding engaging slot 461 with rotary of the first rotating wheel due to smooth engagement of each engaging member 467 and the corresponding engaging slot 461 when the electro-actuating member 36 drives the first rotating wheel 42 to rotate. Accordingly, the first rotating wheel 42 could be not interfered with the second rotating wheel 44, so that the first rotating wheel 42 could still rotate relative to the second rotating wheel 44. In other words, the electro-actuating member 36 could not drive the first rotating wheel 42 and the second rotating wheel 44 to rotate simultaneously. Via the aforesaid design, the torsion force outputted by the electro-actuating member 36 could be still transmitted to the first rotating wheel 42 so as to make the rotating wheel 42 idle even if the second rotating wheel 44 is in a jamming status. In such a manner, the present invention could prevent the inner components of the electro-actuating member 36 from being damaged due to the high temperature caused by accumulation of heat energy transformed from the torsion force if the torsion force could not be outputted.

In this embodiment, the electro-actuating member 36 utilizes the worm gear 48 to be engaged with the first rotating wheel 42 and utilizes the second rotating wheel 44 to be engaged with the transmission gear portion 501 of the pushing member 50. In another embodiment, the electro-actuating member 36 could utilize the worm gear 48 to be engaged with the second rotating wheel 44 and utilize the first rotating wheel 42 to be engaged with the transmission gear portion 501 of the pushing member 50, wherein the second rotating wheel 44 could be a bevel gear, and the first rotating wheel 42 could be a spur gear. In other words, the electro-actuating member 36 could utilize the worm gear 48 to be selectively engaged with the first rotating wheel 42 or the second rotating wheel 44. As for which design is utilized, it depends on the practical application of the electro-mechanical lock 30.

Figure 6:
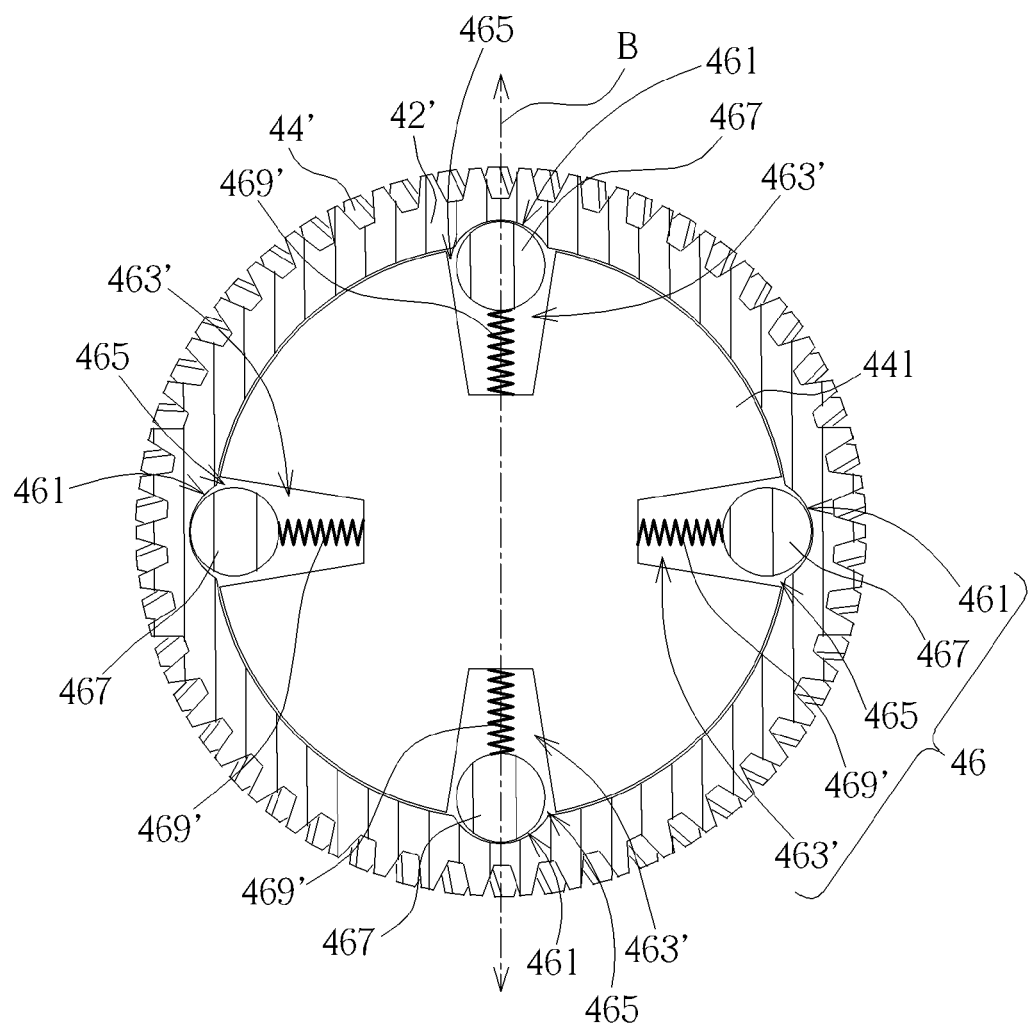
FIG. 6 is a sectional diagram of a first rotating wheel, a second rotating wheel, and an interference mechanism according to another embodiment of the present invention.

Please refer to FIG. 6, which is a sectional diagram of a first rotating wheel 42', a second rotating wheel 44', and an interference mechanism 46' according to another embodiment of the present invention. As shown in FIG. 5 and FIG. 6, the major difference between the interference mechanism 46' and the interference mechanism 46 is that the interference mechanism 46' includes four elastic members 469', four containing slots 463', and four engaging members 467. In this embodiment, each elastic member 469' is a compressed spring, each containing slot 463' is a long concave slot, and each compressed spring is disposed in the corresponding long concave slot respectively. Accordingly, each compressed spring could provide the corresponding engaging member 467 with elastic force in the radial direction B respectively, so as to push the corresponding engaging member 467 to move outward in the radial direction B. In such a manner, each engaging member 467 could be engaged with the corresponding engaging slot 461 via the corresponding opening 465 (as shown in FIG. 6). Thus, the first rotating wheel 42' and the second rotating wheel 44' could be interfered with each other via each engaging member 467, so as to make the torsion force outputted by the electro-actuating member 36 capable of being transmitted between the first rotating wheel 42 and the second rotating wheel 44. Components both shown in FIG. 6 and FIG. 5 represent components with similar structures or functions, and the related description is omitted herein.

Figure 7:
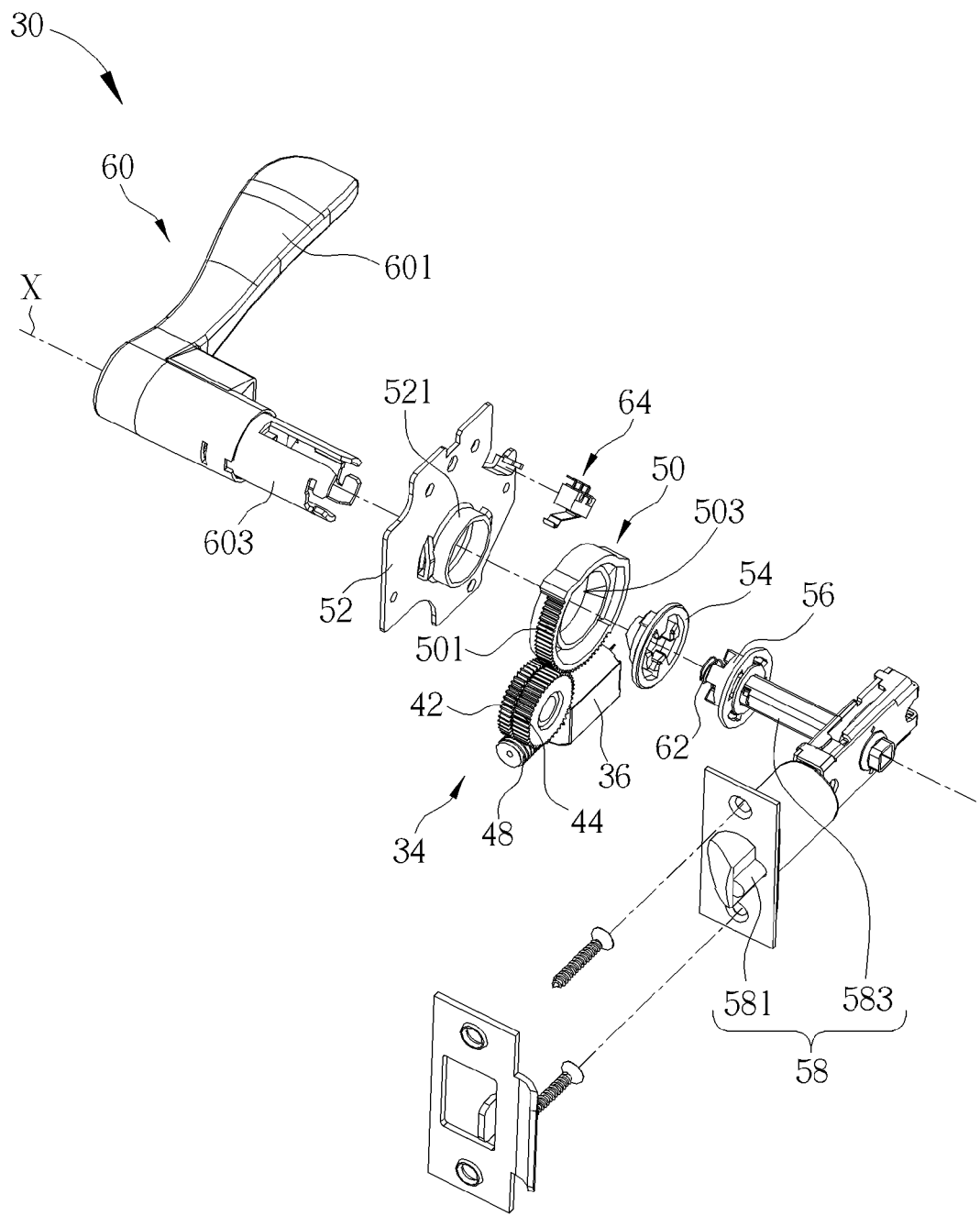
FIG. 7 is a partial exploded diagram of the electro-mechanical lock according to an embodiment of the present invention.
Figure 8:
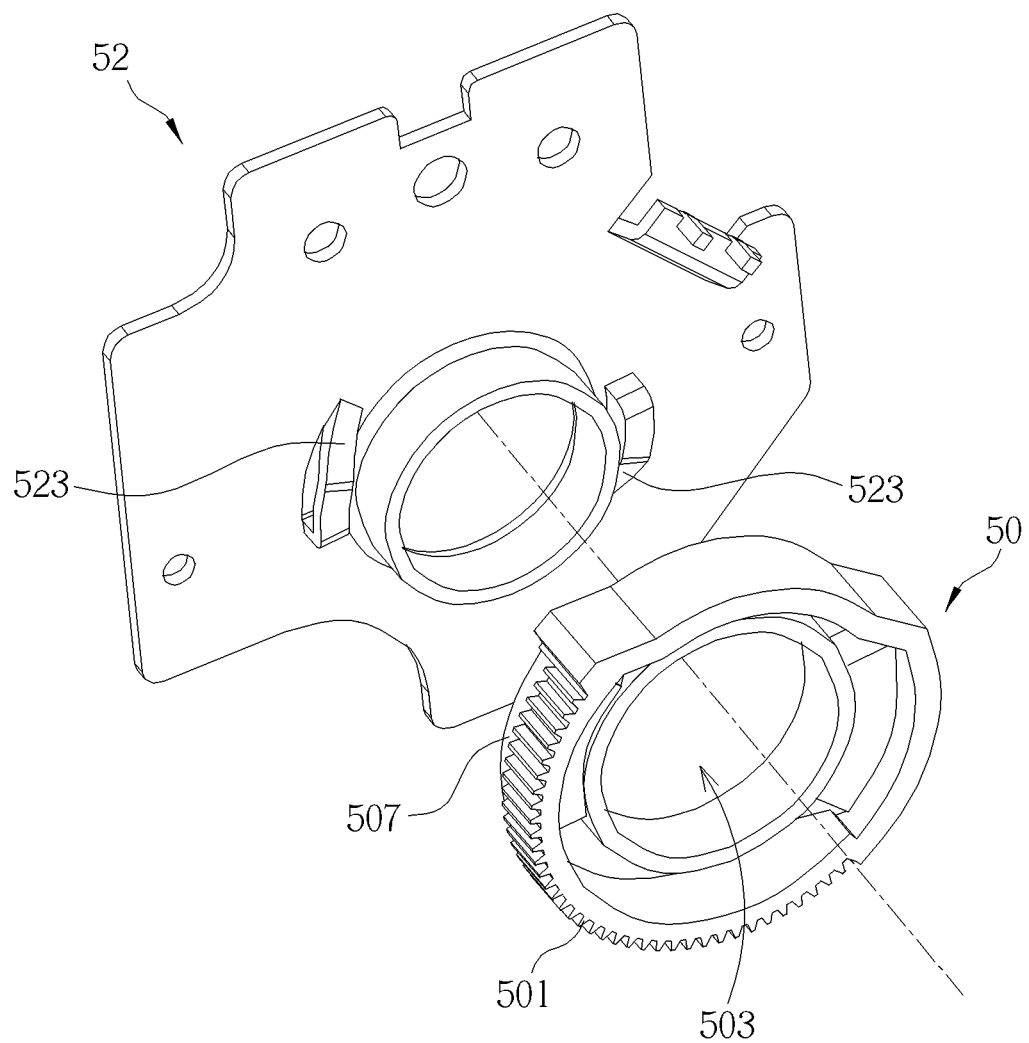
FIG. 8 is an exploded diagram of a bottom board and a pushing member in FIG. 7.
Figure 9:
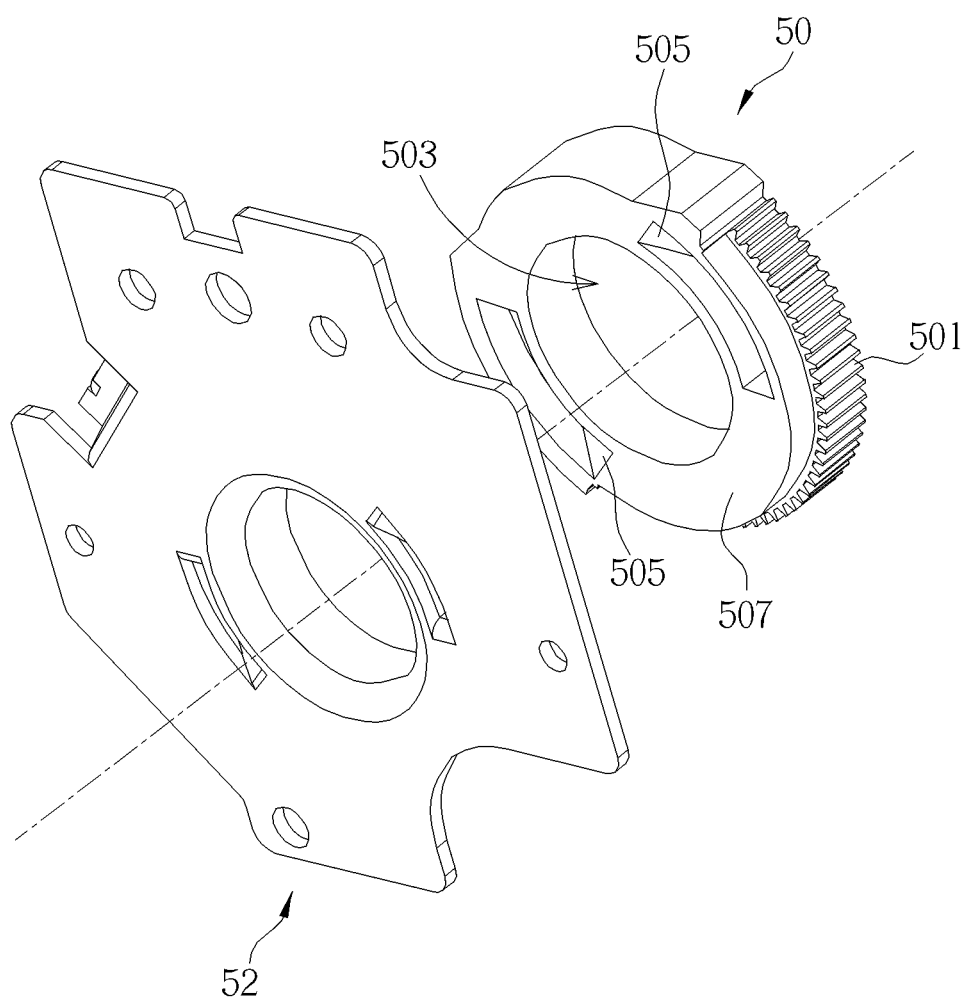
FIG. 9 is an exploded diagram of the bottom board and the pushing member in FIG. 8 at another viewing angle.

Please refer to FIG. 1 and FIG. 7. FIG. 7 is a partial exploded diagram of the electro-mechanical lock 30 according to an embodiment of the present invention. As shown in FIG. 1 and FIG. 7, the transmission mechanism 34 further includes a bottom board 52 for being screwed onto the door 32 so as to fix the transmission mechanism 34 onto the door 32. The bottom board 52 has an shaft tube 521, and the pushing member 50 has a hole 503. When the pushing member 50 is assembled with the bottom board 52, the shaft tube 521 is disposed through the hole 503 so that the pushing member 50 could be rotatable relative to the bottom board 52. Please refer to FIG. 8 and FIG. 9. FIG. 8 is an exploded diagram of the bottom board 52 and the pushing member 50 in FIG. 7. FIG. 9 is an exploded diagram of the bottom board 52 and the pushing member 50 in FIG. 8 at another viewing angle. As shown in FIG. 8 and FIG. 9, the bottom board 52 has two first pushed structures 523, and the pushing member 50 further has two second pushed structures 505 and a pushing portion 507. The second pushed structures 505 are formed on the pushing portion 507. The first pushed structures 523 are formed on the bottom board 52 corresponding to the second pushed structures 505.

It should be mentioned that the number of the first pushed structures 523 and the second pushed structures 505 is not limited to this embodiment. For example, the bottom board 52 could have only one first pushed structure 523, and the pushing member 50 could have only one corresponding second pushed structure 505. In another embodiment, the bottom board 52 could have three first pushed structures 523, and the pushing member 50 could also have three corresponding second pushed structures 505. In other words, all designs in which the bottom board 52 has at least one first pushed structure 523 and the pushing member 50 has at least one second pushed structure 505 may fall within the scope of the present invention. In this embodiment, the first pushed structure 523 and the second pushed structure 505 are an inclined-surface structure respectively.

Figure 10:
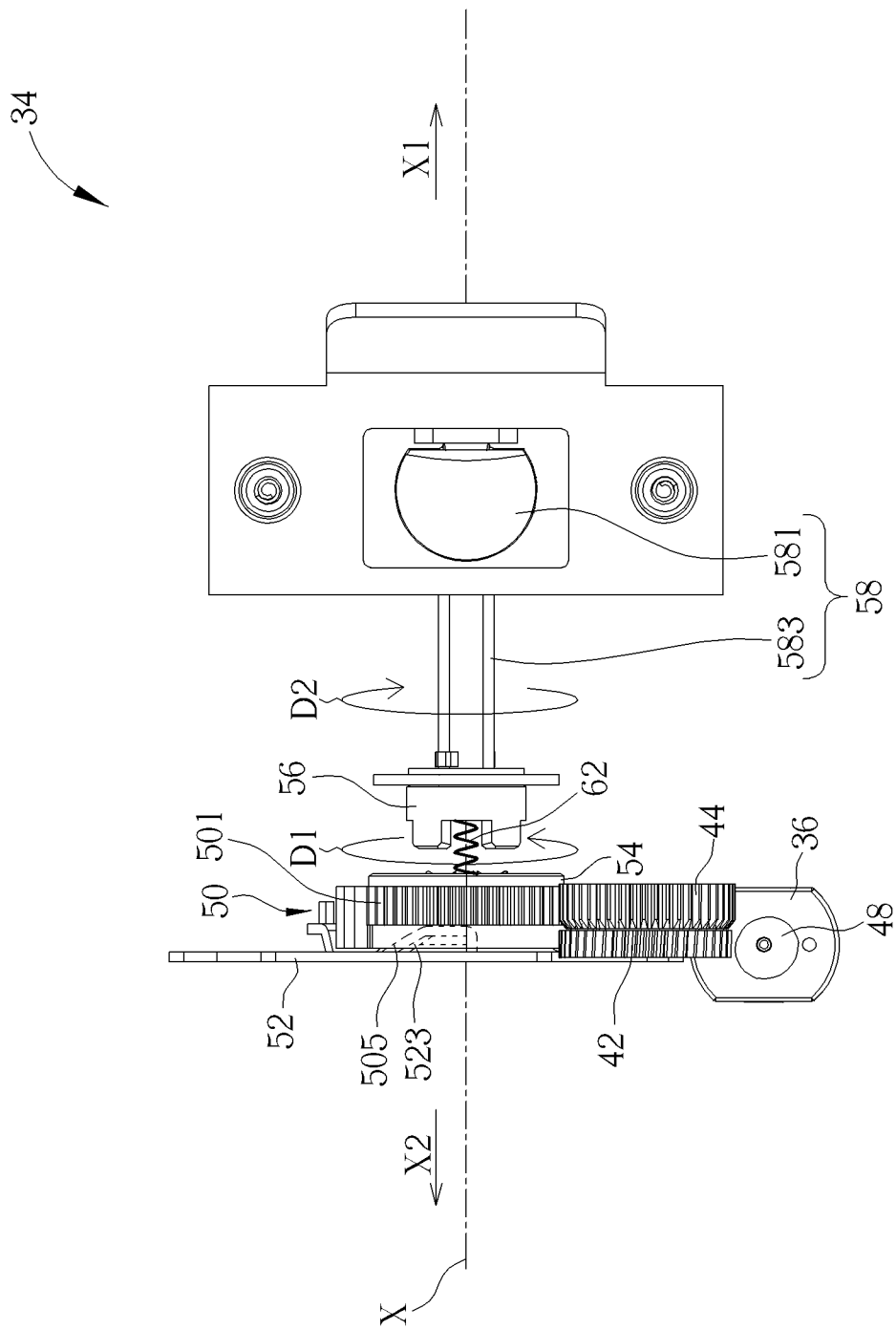
FIG. 10 is a diagram of a transmission mechanism being in an initial status according to an embodiment of the present invention.
Figure 11:
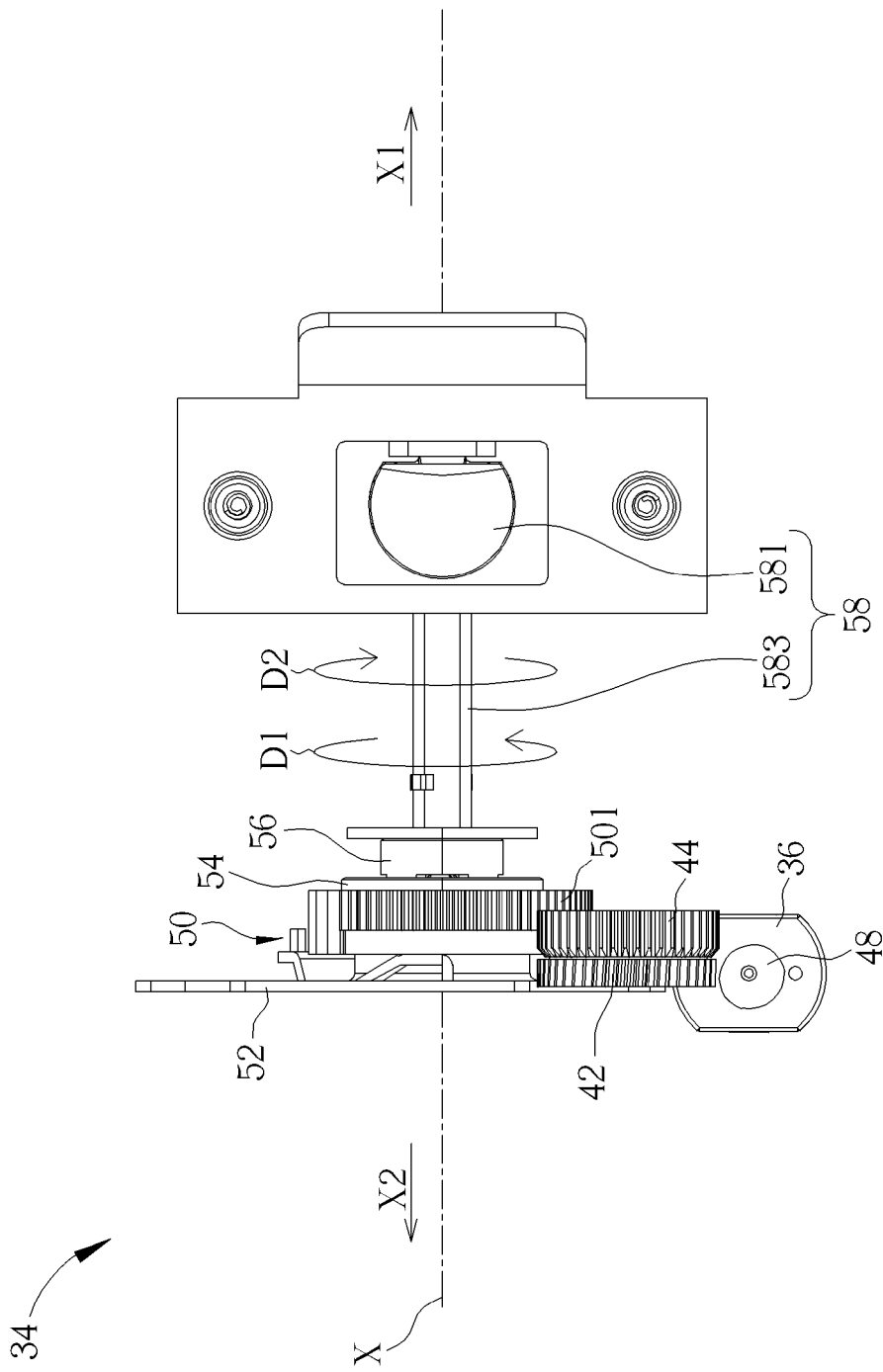
FIG. 11 is a diagram of the transmission mechanism in FIG. 10 being in an unlocked status.

Please refer to FIG. 7, FIG. 10, and FIG. 11. FIG. 10 is a diagram of the transmission mechanism 34 being in an initial status according to an embodiment of the present invention. FIG. 11 is a diagram of the transmission mechanism 34 in FIG. 10 being in an unlocked status. As shown in FIG. 7, FIG. 10, and FIG. 11, the transmission mechanism 34 further includes a clutch member 54 and a driving cam 56. The clutch member 54 abuts against the pushing member 50 so that the clutch member 54 could be pushed with movement of the pushing member 50, and the driving cam 56 is detachably engaged with the clutch member 54. Furthermore, the transmission mechanism 34 further includes a latch assembly 58 connected to the driving cam 56. The latch assembly 58 includes a latch 581 and a driving spindle 583. The latch 581 is used for engaging with the wall 31. The driving spindle 583 is used for connecting to the driving cam 56 and the latch 581. Moreover, the driving cam 56 is fixed to an end of the driving spindle 583.

As shown in FIG. 1 and FIG. 7, the electro-mechanical lock 30 further includes a handle device 60 rotatable relative to a long axis X. The handle device 60 includes a handle portion 601 and a tube portion 603. The handle portion 601 is exposed from an external side of the bottom board 52 relative to the door 32 for a user to operate. The tube portion 603 is connected to the handle portion 601 and passes through the shaft tube 521 of the bottom board 52, and the driving spindle 583 is not linked with the tube portion 603. Furthermore, the clutch member 54 is slidably disposed through an end of the tube portion 603. Accordingly, the clutch member 54 is movable relative to the tube portion 603 in the long axis X, so as to be disengaged from or engaged with the driving cam 56. As shown in FIG. 10 and FIG. 11, when the torsion force outputted by the electro-actuating member 36 is transmitted to the pushing member 50 via the worm gear 48, the first rotating wheel 42 and the second rotating wheel 44 sequentially so as to drive the pushing member 50 to rotate toward a first direction D1 relative to the long axis X, the second pushed structure 505 of the pushing member 50 could abut against the first pushed structure 523 of the bottom board 52 so as to transform the torsion force of the pushing member 50 into an axial pushing force. Thus, the pushing member 50 could slide on the tube portion 603 and move relative to the bottom board 52 along a first movement direction X1. In such a manner, the clutch member 54 could be pushed with movement of the pushing member 50 from an initial position as shown in FIG. 10 to an unlocked position as shown in FIG. 11.

To be more specific, when the clutch member 54 is pushed to the unlocked position by the pushing member 50 along the tube portion 603, the clutch member 54 is engaged with the driving cam 56 disposed on the end of the driving spindle 583. At this time, if the user rotates the handle portion 601 of the handle device 60, the torsion force exerted by the user could be transmitted to the clutch member 54 along the long axis X via the tube portion 603. As mentioned above, since the clutch member 54 is engaged with the driving cam 56 at the unlocked position, the torsion force could be transmitted from the clutch member 54 to the driving cam 56 along the long axis X. Subsequently, the driving spindle 583 could be driven to rotate by the torsion force, so as to drive the latch 581 to be disengaged from the wall 31. As a result, the door 32 could be correspondingly in the unlocked status.

Furthermore, the transmission mechanism 34 further includes an elastic member 62 disposed between the clutch member 54 and the driving cam 56. When the clutch member 54 is located at the unlocked position as shown in FIG. 11, the clutch member 54 could be engaged with the driving cam 56 to compress the elastic member 62. Accordingly, there is an elastic potential energy stored in the elastic member 62 due to deformation of the elastic member 62, and the transmission mechanism 34 could be able to unlock for a period of time. Afterward, the transmission mechanism 34 could return back to a status in which the transmission mechanism 34 is unable to unlock. The related description is provided as follows. When the torsion force generated by the electro-actuating member 36 is transmitted to the pushing member 50 via the worm gear 48, the first rotating wheel 42 and the second rotating wheel 44 sequentially, the pushing member 50 could be driven to rotate toward a second direction D2 (opposite to the first direction D1) relative to the long axis X. At this time, since the second pushed structure 505 of the pushing member 50 no longer abuts against the first pushed structure 523 of the bottom board 52, the clutch member 54 could be not pushed by the axial pushing force of the pushing member 50. As a result, the elastic potential energy of the elastic member 62 could be released to generate an elastic force. Thus, the clutch member 54 could be driven by the elastic force of the elastic member 62 to slide on the tube portion 603 and then move from the unlocked position as shown in FIG. 11 to the initial position as shown in FIG. 10 relative to the bottom board 52 along a second movement direction X2 (opposite to the first movement direction X1). During the aforesaid process, the clutch member 54 could be disengaged from the driving cam 56.

In brief, when the clutch member 54 is pushed by the pushing member 50 to slide to the initial position along the tube portion 603, the clutch member 54 could be disengaged from the driving cam 56 disposed on the end of the driving spindle 583. At this time, if the user rotates the handle portion 601 of the handle device 60, the torsion force exerted by the user could not be transmitted to the clutch member 54 via the tube portion 603 along the long axis X. Furthermore, the torsion force could also not be transmitted from the clutch member 54 to the driving cam 56 along long axis X since the clutch member 54 is disengaged from the driving cam 56 at the initial position. That is, the handle device 60 could be unable to transmit the torsion force to the latch assembly 58, so that the transmission mechanism 34 could be unable to unlock. Thus, the door 32 could be in the locked status steadily.

Figure 12:
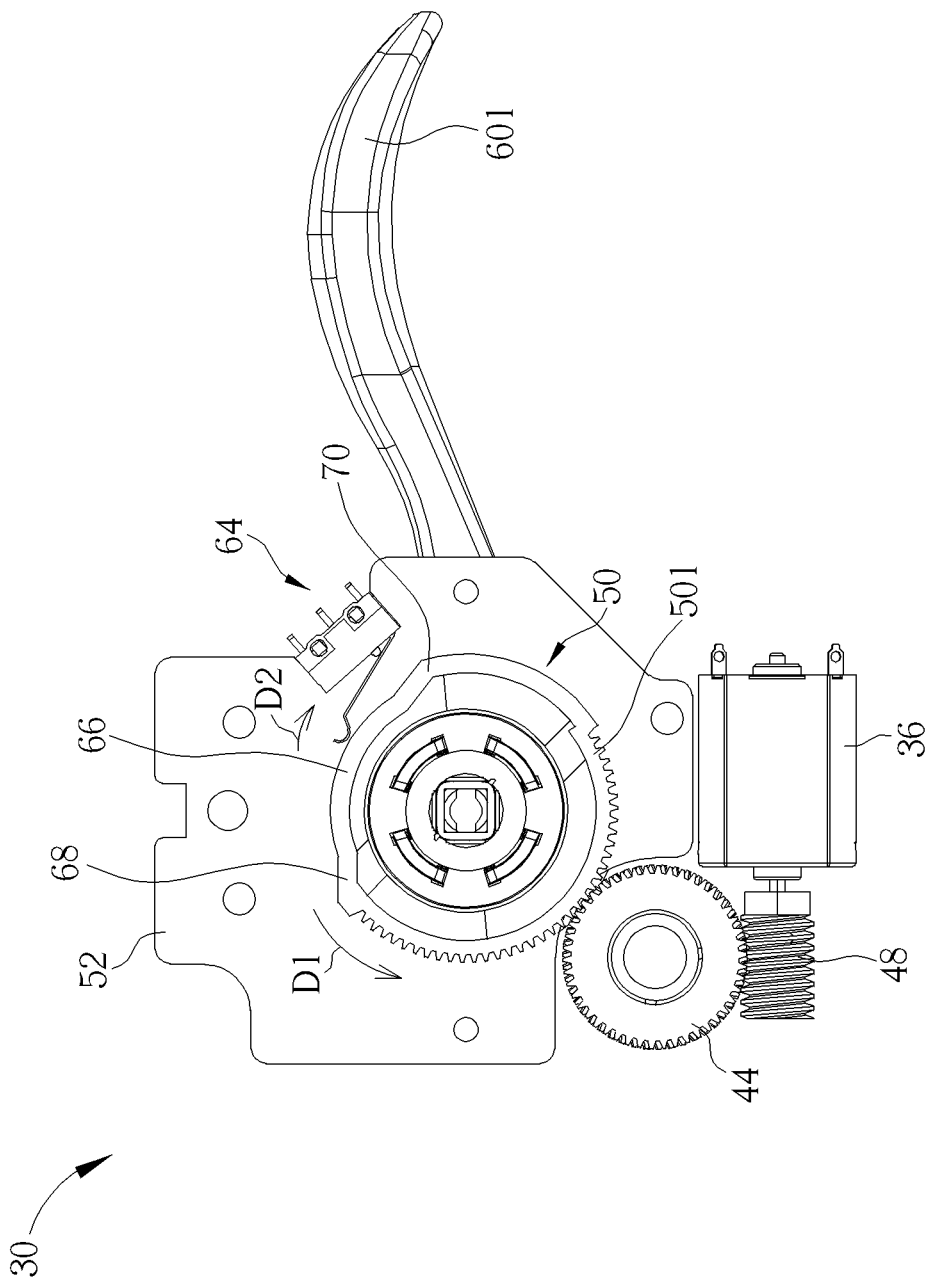
FIG. 12 is a partial diagram of the electro-mechanical lock according to an embodiment of the present invention.

Please refer to FIG. 12, which is a partial diagram of the electro-mechanical lock 30 according to an embodiment of the present invention. As shown in FIG. 12, the electro-mechanical lock 30 further includes a contact switch 64, and the pushing member 50 further has a third pushed structure 66. When the contact switch 64 contacts with the third pushed structure 66, the electro-actuating member 36 could be activated. The third pushed structure 66 of the pushing member 50 has a stop end 68 and a reverse end 70. The stop end 68 and the reverse end 70 are used for respectively controlling the electro-actuating member 36 to stop and rotate reversely. For example, when the electro-mechanical lock 30 is located at a position as shown in FIG. 12, the contact switch 64 of the electro-mechanical lock 30 contacts with the third pushed structure 66. At this time, the electro-actuating member 36 could be controlled to rotate forwardly, so as to drive the pushing member 50 to rotate toward the first direction D1 until the contact switch 64 contacts with the reverse end 70. When the contact switch 64 contacts with the reverse end 70, the electro-actuating member 36 could rotate reversely after stopping rotating forwardly for a predetermined time, so as to drive the pushing member 50 to rotate toward the second direction D2 (opposite to the first direction D1) until the contact switch 64 contacts with the stop end 68 of the third pushed structure 68 to deactivate the electro-actuating member 36.

In such a manner, the electro-mechanical lock 30 could utilize the third pushed structure 66 to control the electro-actuating member 36 for driving the pushing member 50 to rotate toward the first direction D1, and utilize the reverse end 70 to control the electro-actuating member 36 for driving the pushing member 50 to rotate toward the second direction D2 opposite to the first direction D1. Accordingly, the clutch member 54 could move on the tube portion 603 along the first movement direction X1 or the second movement direction X2 opposite to the first movement direction X1, so as to achieve the purpose that the clutch member 54 could be detachably engaged with the driving cam 56.

Figure 13:
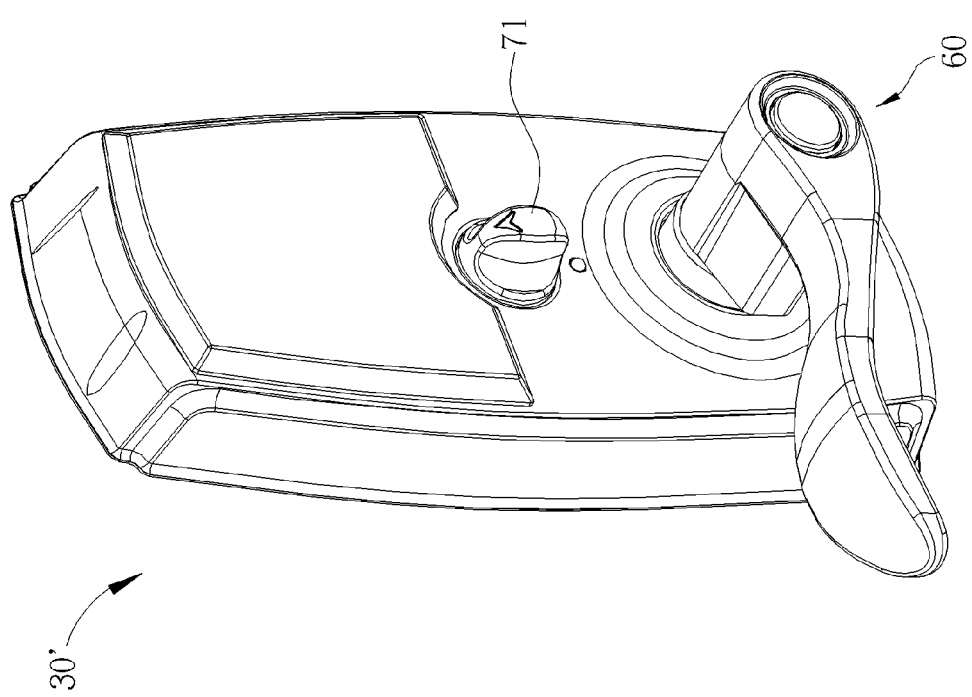
FIG. 13 is a diagram of an electro-mechanical lock according to another embodiment of the present invention.

Please refer to FIG. 13, which is a diagram of an electro-mechanical lock 30' according to another embodiment of the present invention. As shown in FIG. 13, the electro-mechanical lock 30' further includes an unlocking member 71 coupled to the control unit 40. The control unit 40 could control whether to activate the electro-actuating member 36 to push the clutch member 54 to the unlocked position according to the position of the unlocking member 71. Furthermore, when the clutch member 54 moves to the unlocked position via the aforesaid design, the control unit 40 could deactivate the electro-actuating member 56 to make the pushing member 50 keep abutting against the clutch member 54, so that the clutch member 54 could be located at the unlocked position and engaged with the driving cam 56. Thus, the door 32 could be in the unlocked status for a long period of time.

For example, when the unlocking member 71 is located at a position as shown in FIG. 13, the pushing member 50 and the clutch member 54 are located at the initial position as shown in FIG. 10. At this time, the user needs to utilize the input unit 38 to input the signal to the control unit 40 for driving the transmission mechanism 34 to unlock the door 32. Furthermore, when the unlocking member 71 rotates from the position as shown in FIG. 13 by 90°, the electro-actuating member 36 could be activated to rotate forwardly, so as to drive the pushing member 50 to rotate toward the first direction D1, and then be deactivated before the contact switch 64 contacts with the reverse end 71 of the third pushed structure 66. Thus, the pushing member 50 and the clutch member 54 could be located at the unlocked position as shown in FIG. 11. At this time, the clutch member 54 of the electro-mechanical lock 30' could be driven to engage with the driving cam 56, so that the user could rotate the handle portion 60 to unlock the door 32 without utilizing the input unit 38 to input the signal.

In practical application, the electro-mechanical lock 30' could be utilized cooperatively with the electro-mechanical lock 30, meaning that the electro-mechanical lock 30' could be installed indoor and the electro-mechanical lock 30 could be installed outdoor. Accordingly, the user could utilize the electro-mechanical lock 30 to unlock the door 32 outdoor, and could utilize the electro-mechanical lock 30' to control the door 32 indoor to be in the unlocked status for a long period of time. In such a manner, when the user needs to open the door 32 frequently, there is no need to input the signal for the user every time. Via the aforesaid design, the electro-mechanical lock provided by the present invention could be more convenient in use.

Figure 14:
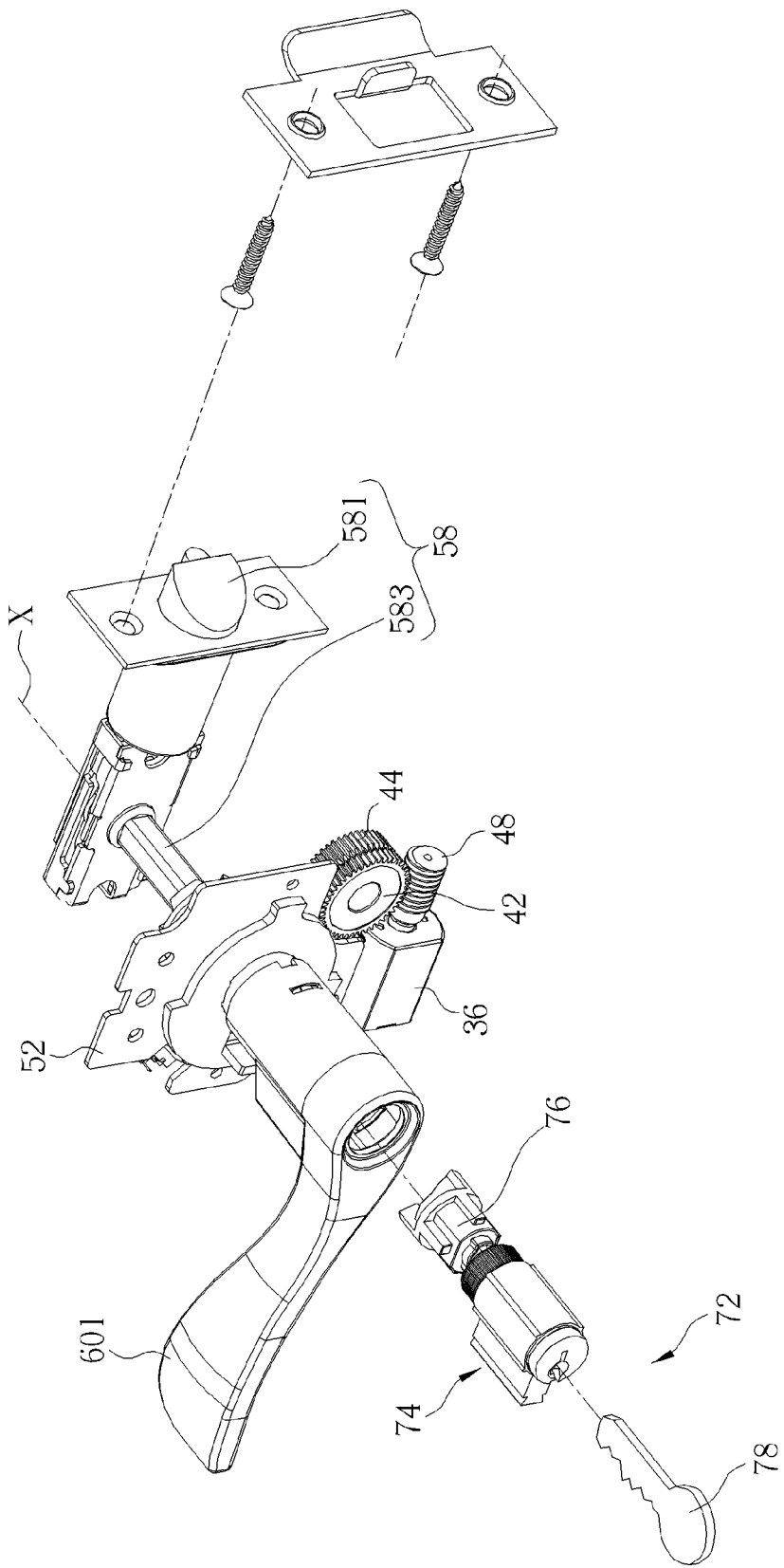
FIG. 14 is a partial exploded diagram of the electro-mechanical lock according to an embodiment of the present invention.
Figure 15:
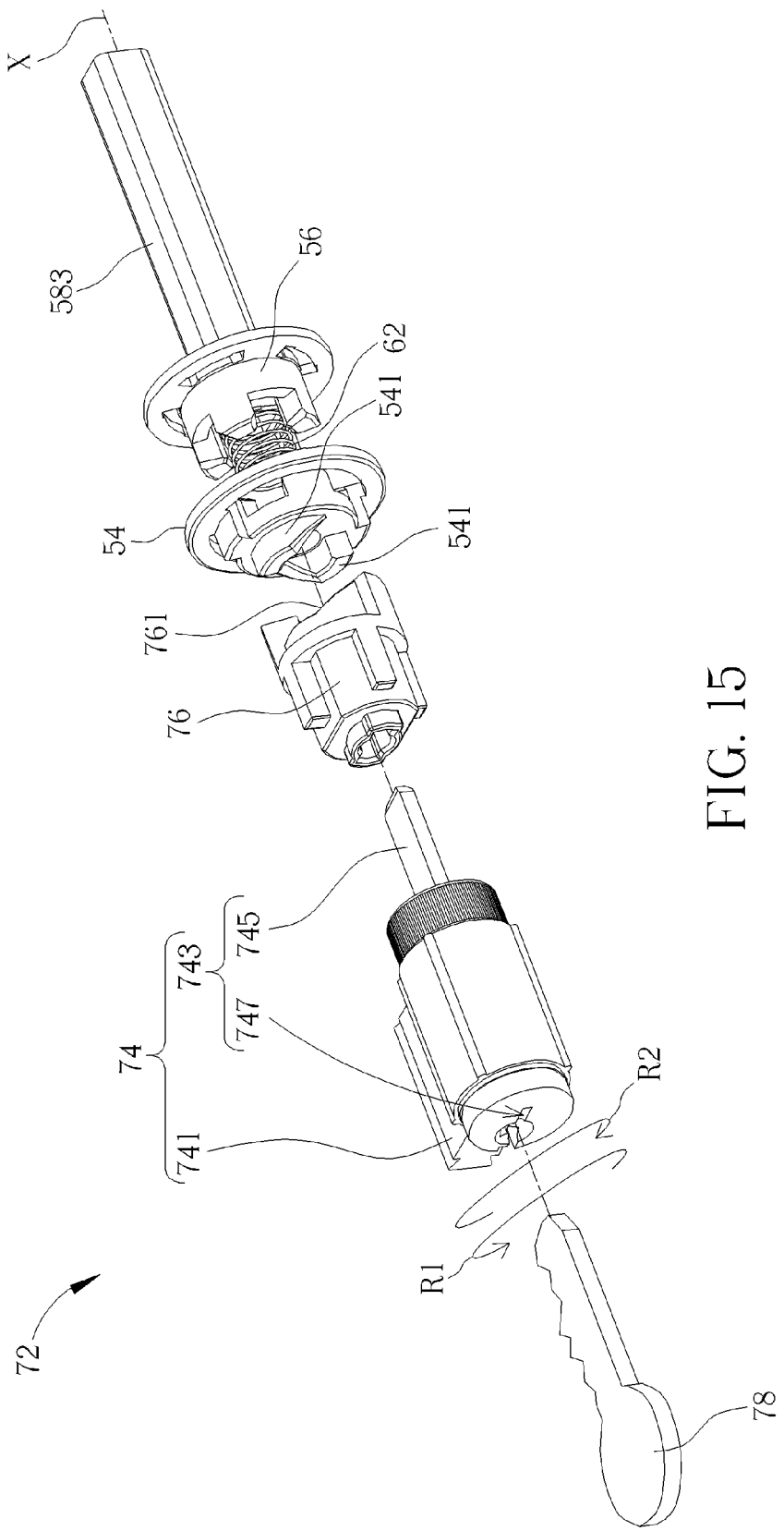
FIG. 15 is an exploded diagram of a clutch mechanism in FIG. 14.
Figure 16:
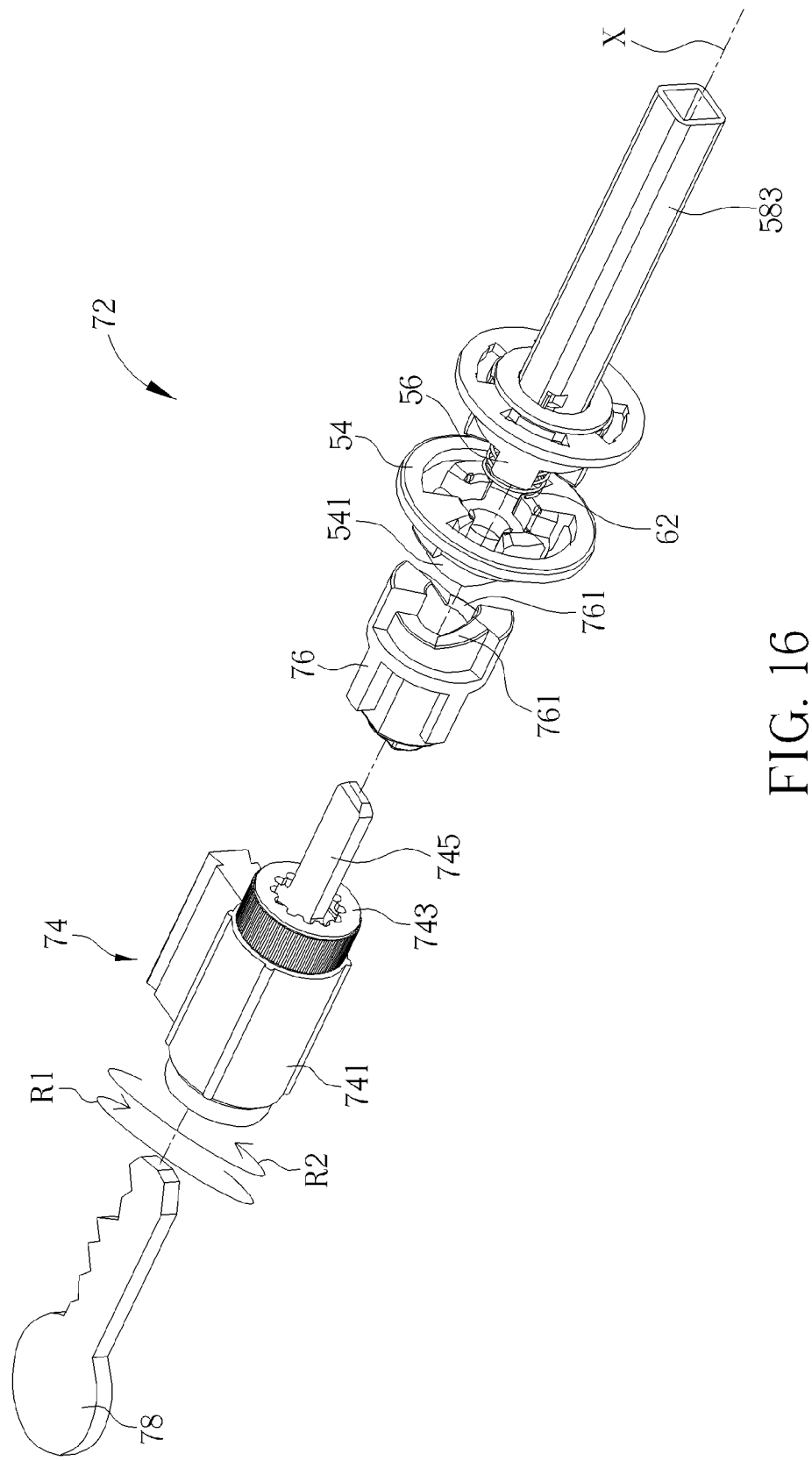
FIG. 16 is an exploded diagram of the clutch mechanism in FIG. 15 at another viewing angle.

Please refer to FIG. 14, which is a partial exploded diagram of the electro-mechanical lock 30 according to an embodiment of the present invention. As shown in FIG. 14, the electro-mechanical lock 30 could further have a clutch mechanism 72. The clutch mechanism 72 is used for transmitting the torsion force received by the handle device 60 to the latch assembly 58 along the long axis X when the user operates the handle device 60, so as to drive the latch assembly 58 to unlock the door 32. Please refer to FIGS. 14-16. FIG. 15 is an exploded diagram of the clutch mechanism 72 in FIG. 14. FIG. 16 is an exploded diagram of the clutch mechanism 72 in FIG. 15 at another viewing angle. As shown in FIGS. 14-16, the clutch mechanism 72 includes a key assembly 74 installed in the handle portion 601 of the handle device 60. In this embodiment, the clutch mechanism 72 further includes a rotating member 76 having two first pushed structures 761 and the aforesaid clutch member 54 having two second pushed structures 541. The second pushed structures 541 of the clutch member 54 abut against the first pushed structure 761 of the rotating member 76 respectively.

The number of the first pushed structures 761 on the rotating member 76 and the second pushed structures 541 on the clutch member 54 is not limited to this embodiment. For example, the rotating member 76 could have only one first pushed structure 761, and the clutch member 54 could have only one corresponding second pushed structure 541. In another embodiment, the rotating member 76 could have three first pushed structures 761, and the clutch member 54 could also have three corresponding second pushed structures 541. In other words, all designs in which the rotating member 76 has at least one first pushed structure 761 and the clutch member 54 has at least one second pushed structure 541 may fall within the scope of the present invention. In this embodiment, the first pushed structure 761 and the second pushed structure 541 are an inclined-surface structure respectively.

As shown in FIG. 15 and FIG. 16, the key assembly 74 includes a lock casing 741 and a lock cylinder 743 engaged with the lock casing 741. The lock casing 741 is used for protecting the lock cylinder 743 so as to prevent the inner components of the lock cylinder 743 from being damaged. The lock cylinder 743 has a driving board 745. The driving board 745 is engaged with the rotating member 76 for driving the rotating member 76 to rotate. Movement of the rotating member 76 is constrained in the long axis direction X. The lock cylinder 743 further has a lock slot 747 for a key member 78 to insert. When the key member 78 is inserted into the lock slot 747, the key member 78 could release engagement of the lock casing 741 and the lock cylinder 743. Accordingly, the user could utilize the key member 78 to drive the lock cylinder 743 to rotate toward a first rotating direction R1 relative to the long axis X or toward a second rotating direction R2 opposite to the first rotating direction R1 relative to the long axis X.

Figure 17:
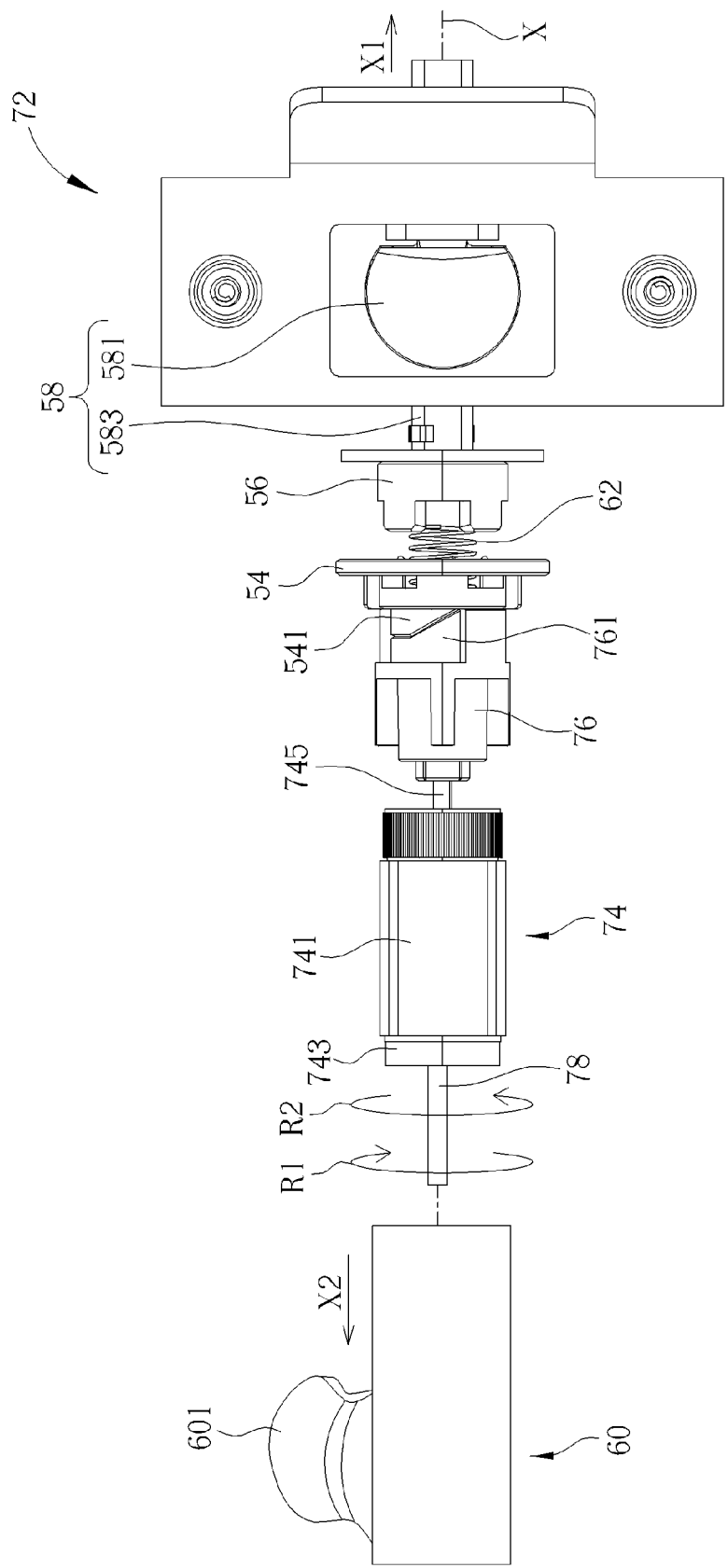
FIG. 17 is a diagram of the clutch mechanism being in an initial status according to an embodiment of the present invention.
Figure 18:
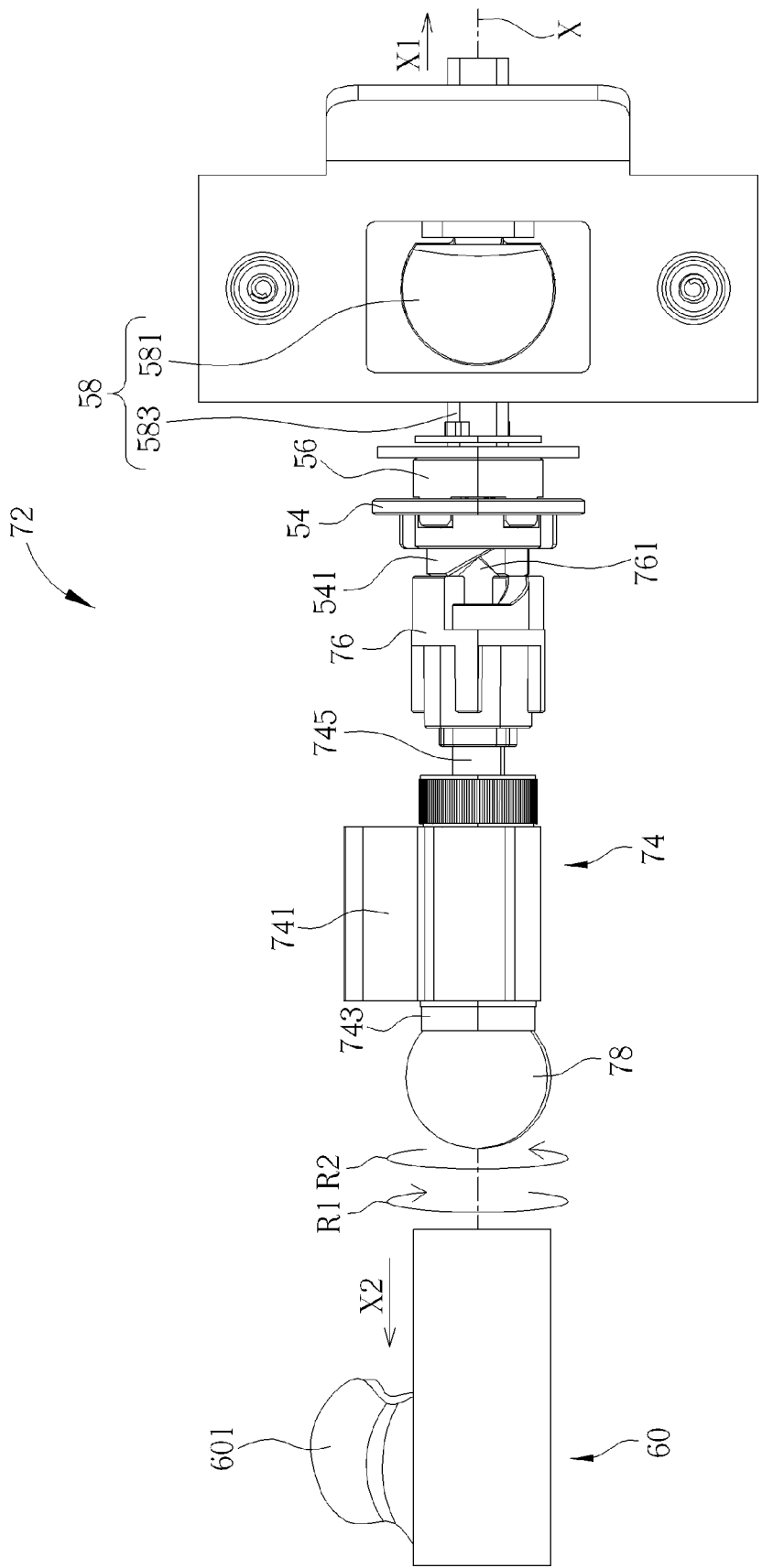
FIG. 18 is a diagram of the clutch mechanism in FIG. 17 being in an unlocked status.

Please refer to FIG. 17 and FIG. 18. FIG. 17 is a diagram of the clutch mechanism 72 being in an initial status according to an embodiment of the present invention. FIG. 18 is a diagram of the clutch mechanism 72 in FIG. 17 being in an unlocked status. As shown in FIG. 17 and FIG. 18, when the user utilizes the key member 78 to drive the lock cylinder 743 to rotate toward the first rotating direction R1 relative to the long axis X, the key assembly 74 could be driven to rotate toward the first rotating direction R1, so as to drive the rotating member 76 to rotate toward the first rotating direction R1. At this time, the first pushed structure 761 of the rotating member 76 abuts against the second pushed structure 541 of the clutch member 54, so as to transform the torsion force generated by the rotating member 76 into an axial pushing force. Accordingly, the rotating member 76 could push the clutch member 54 to move along the first movement direction X1 of the long axis X relative to the rotating member 76. In such a manner, the rotating member 76 could push the clutch member 54 to move from the initial position as shown in FIG. 17 to the unlocked position as shown in FIG. 18 along the first movement direction X1 of the long axis X.

To be more specific, when the rotating member 76 pushes the clutch member 54 to move to the unlocked position along the first movement direction X1 of the first axis X, the clutch member 54 could be engaged with the driving cam 56 disposed on the end of the driving spindle 583. At this time, if the user rotates the handle portion 601 of the handle device 60, the handle device 60 could drive the key assembly 74, the rotating member 76 and the clutch member 54 to rotate simultaneously. In such a manner, the torsion force exerted by the user could be transmitted from the handle device 601 to the clutch member 54 along the long axis X. Subsequently, the torsion force could be transmitted from the clutch member 54 to the driving cam 56 along the long axis X since the clutch member 54 is engaged with the driving cam 56 in the unlocked position. Accordingly, the torsion force could drive the driving spindle 583 of the latch assembly 58 to rotate, so as to drive the latch 581 to be disengaged from the wall 31. As a result, the door 32 could be correspondingly in the unlocked status.

Furthermore, when the clutch member 54 is located at the unlocked position as shown in FIG. 18, the clutch member 54 could compress the elastic member 62. Accordingly, there is an elastic potential energy stored in the elastic member 62. Subsequently, when the user utilizes the key member 78 to drive the lock cylinder 743 to rotate toward the second rotating direction R2 along the long axis X, the key assembly 74 could be driven to rotate toward the second rotating direction R2, so as to drive the rotating member 76 to rotate toward the second rotating direction R2. At this time, the second pushed structure 541 of the clutch member 54 no longer abuts against the first pushed structure 761 of the rotating member 76 so that the clutch member 54 could be not pushed by the axial pushing force of the rotating member 76. As a result, the elastic potential energy of the elastic member 62 could be released to generate an elastic force. Thus, the clutch member 54 could be driven by the elastic force of the elastic member 62 to move from the unlocked position as shown in FIG. 18 to the initial position as shown in FIG. 17 relative to the rotating member 76 along the second movement direction X2 (opposite to the first movement direction X1) of the long axis X. During the aforesaid process, the clutch member 54 could be disengaged with the driving cam 56.

In brief, when the clutch member 54 is pushed by the pushing member 50 to the initial position along the long axis X, the clutch member 54 could be disengaged from the driving cam 56 disposed on the end of the driving spindle 583. At this time, if the user rotates the handle portion 601 of the handle device 60, the handle device 60 could only drive the key assembly 74 and the rotating member 76 to rotate since the torsion force exerted by the user could not be transmitted to the clutch member 54 along the long axis X. Accordingly, the handle device 60 could not transmit the torsion force to the latch assembly 58, so that the door 32 could be still in the locked status.

Figure 19:
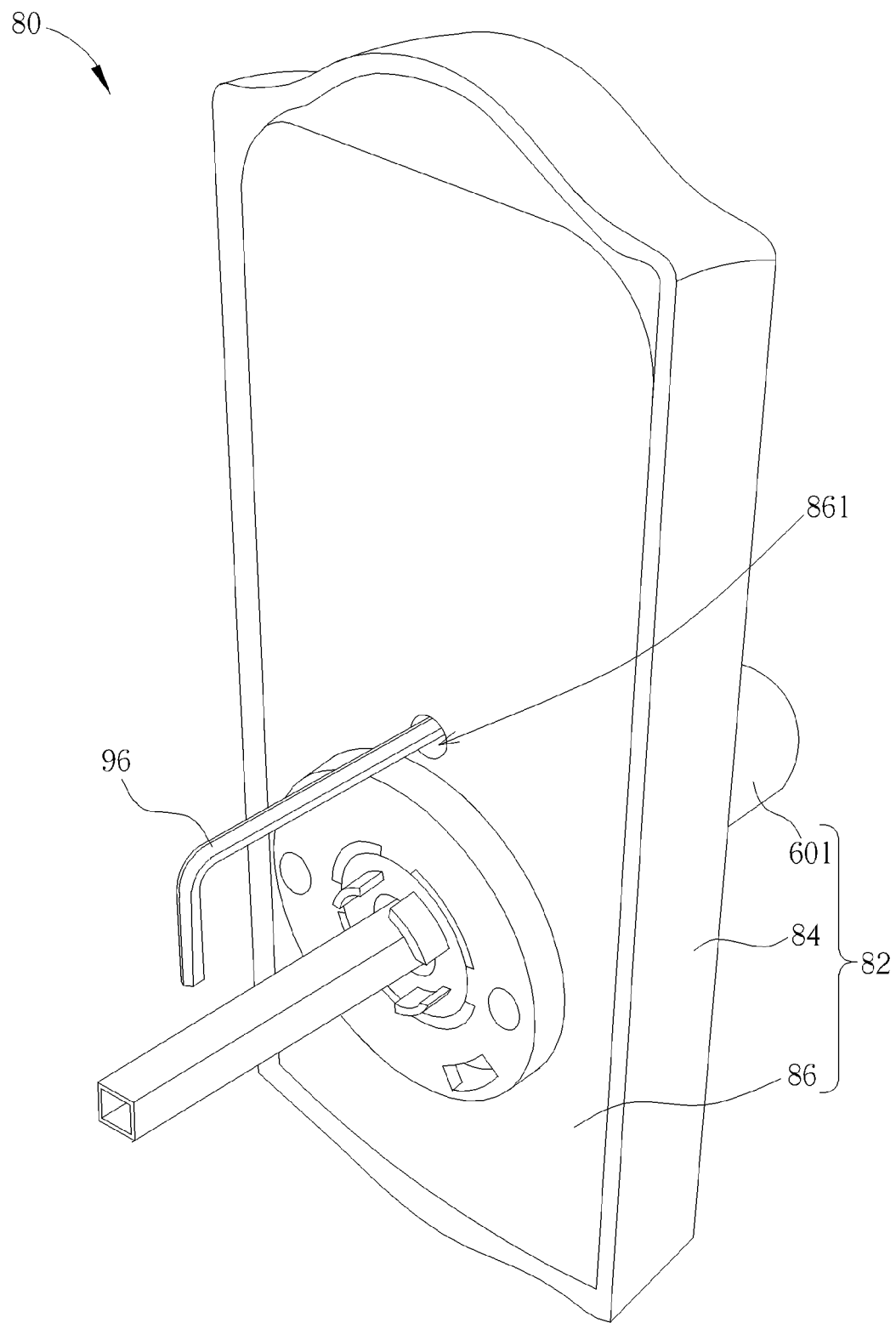
FIG. 19 is a diagram of an electro-mechanical lock according to another embodiment of the present invention.

Please refer to FIG. 19, which is a diagram of an electro-mechanical lock 80 according to another embodiment of the present invention. As shown in FIG. 19, a handle device 82 of the electro-mechanical lock 80 includes a casing 84 fixed to the door 32. The casing 84 is used for installing the handle device 82 on the door 32. The handle portion 601 of the handle device 82 is rotatably disposed on the casing 84, and the handle portion 601 is rotatable relative to the long axis X. The handle device 82 further includes a fixing member 86 fixed to the casing 84 for covering the inner components (e.g. the electro-actuating member, the pushing member, and the clutch member) of the electro-mechanical lock 80 cooperatively with the casing 84, so as to prevent the inner components of the electro-mechanical lock 80 from being damaged when the electro-mechanical lock 80 receives sudden impact.

Figure 20:
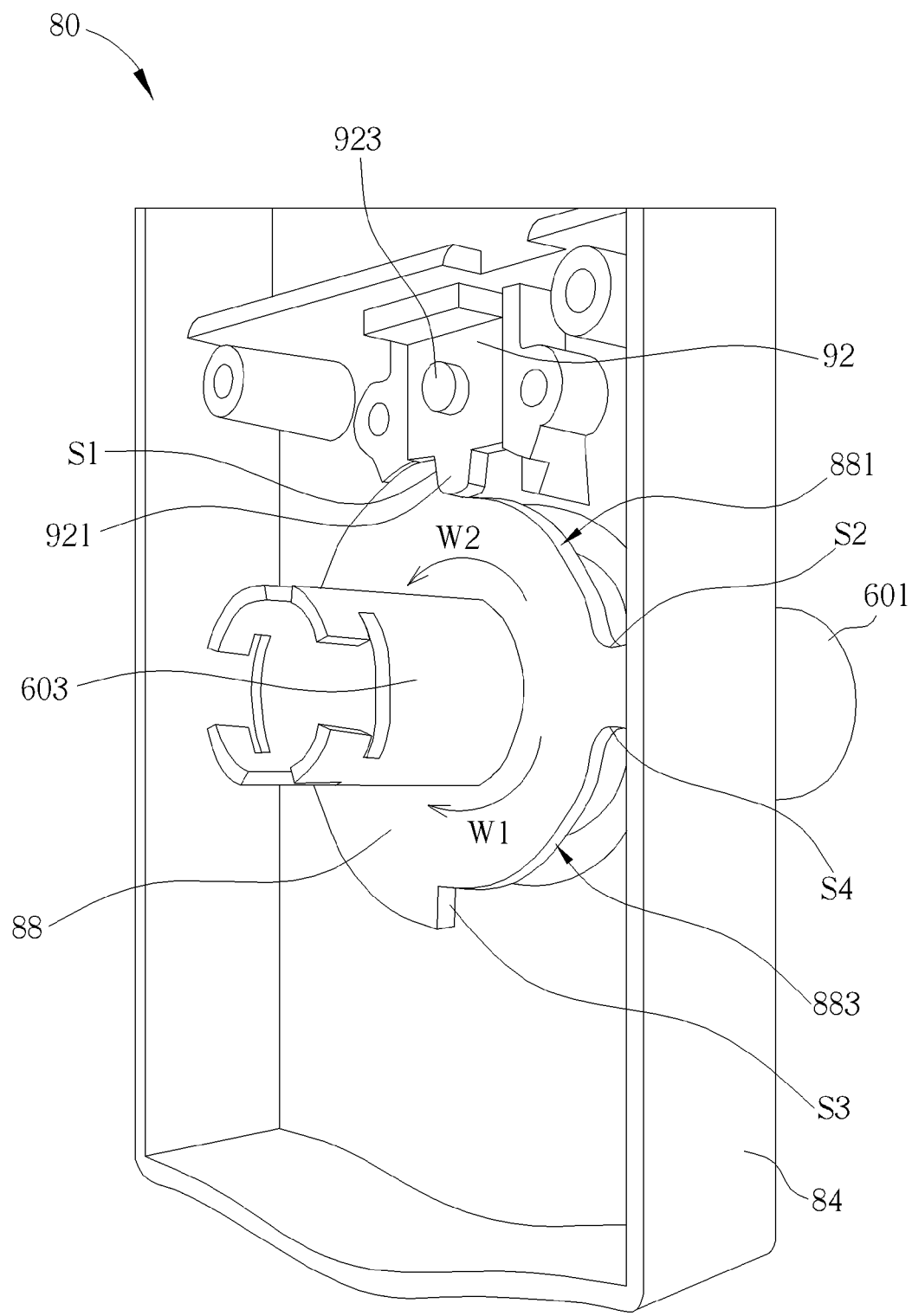
FIG. 20 is an inner diagram of a handle device according to another embodiment of the present invention.
Figure 21:
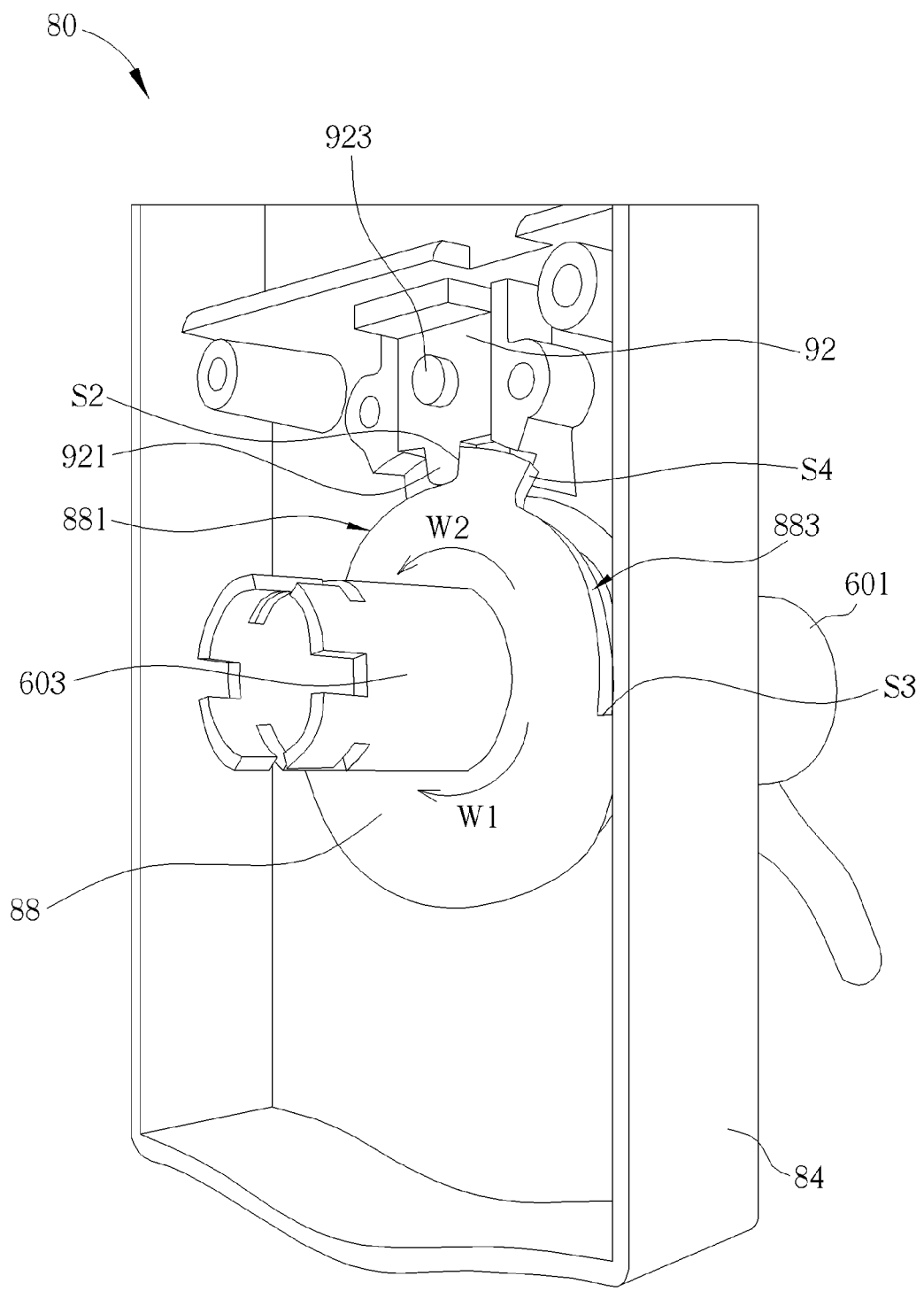
FIG. 21 is an inner diagram of the handle device in FIG. 20 being in another status.
Figure 22:
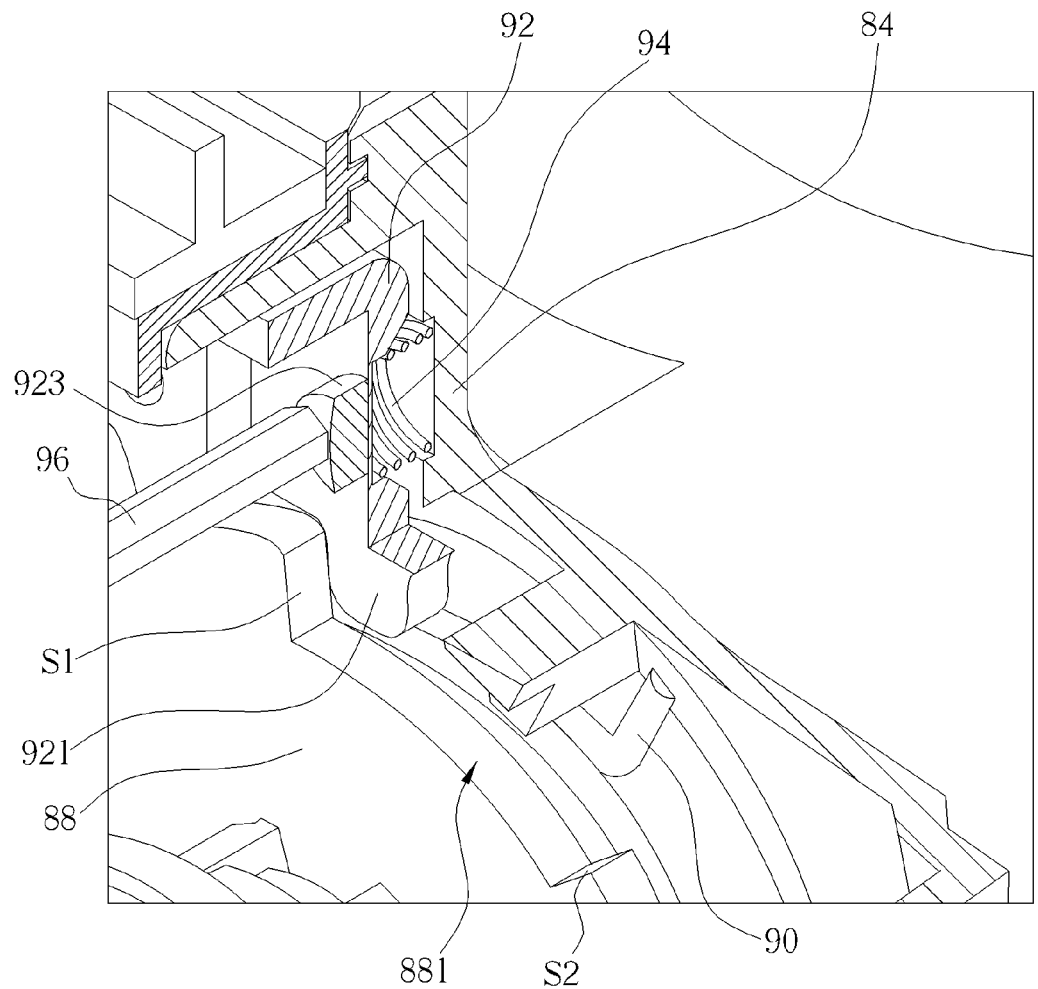
FIG. 22 is a partial sectional diagram of the handle device in FIG. 20.

Please refer to FIGS. 20-22. FIG. 20 is an inner diagram of a handle device 82 according to another embodiment of the present invention. FIG. 21 is an inner diagram of the handle device 82 in FIG. 20 being in another status. FIG. 22 is a partial sectional diagram of the handle device 82 in FIG. 20. As shown in FIGS. 20-22, the handle device 82 further includes a reversing sheet 88. The reversing sheet 88 is connected to the handle portion 601 via the tube portion 603. The tube portion 603 is used for transmitting the torsion force received by the handle portion 601 into the reversing sheet 88. Accordingly, the reversing sheet 88 could be driven by the handle portion 601 to rotate with rotary of the handle portion 601. Furthermore, a first concave slot 881 and a second concave slot 883 are formed on the reversing sheet 88. The first concave slot 881 has a first side S1 and a second side S2, and the second concave slot 883 has a third side S3 and a fourth side S4. In this embodiment, the reversing sheet 88 is substantially a circular structure, and the first concave slot 881 and the second concave slot 883 are an arc-shaped concave slot respectively and are formed on a periphery of the circular structure.

As shown in FIG. 22, the handle device 82 further includes a return member 90. The return member 90 is disposed between the casing 84 and the reversing sheet 88 for providing a torsion torque to drive the reversing sheet 88 to return back to its original position. That is, when the handle device 82 is driven to rotate by an external force, there is an elastic potential energy stored in the return member 90. On the other hand, if there is no external force exerted on the handle device 82, the elastic potential energy of the return member 90 could be released to generate an elastic force. Furthermore, the handle device 82 further includes a stop sheet 92. The stop sheet 92 is disposed at a side of the reversing sheet 88 and movable along a direction parallel to the long axis X. The stop sheet 92 has a stop structure 921 protruding from the first concave slot 881 or the second concave slot 883 of the reversing sheet 88. As shown in FIGS. 19-22, a hole 861 is formed on the fixing member 86, and a protruding point 923 is formed on the stop sheet 92 corresponding to the hole 861. Furthermore, the handle device 82 further includes an elastic member 94. The elastic member 94 abuts against the stop sheet 92 and the casing 84 elastically, so as to cause the stop sheet 92 to be biased. Accordingly, the elastic member 94 could support the stop sheet 92, so that the protruding point 923 of the stop sheet 92 could protrude from the hole 861 of the fixing member 86.

When the stop sheet 92 is biased by the elastic member 94, the stop sheet 92 could move toward the reversing sheet 88 along the direction parallel to the long axis X. Accordingly, the stop structure 921 of the stop sheet 92 could protrude from the first concave slot 881 or the second concave slot 883 of the reversing sheet 88, so that the handle portion 601 could be correspondingly in a first orientation status or a second orientation status. In this embodiment, the elastic member 94 could be preferably a compressed spring, but not limited thereto. For example, the elastic member 94 could also be an elastic support structure, such as a rubber pad. In other words, all structures capable of supporting and elastically abutting against the stop sheet 92 may fall within the scope of the present invention.

When the stop structure 921 of the stop sheet 92 protrudes from the first concave slot 881 of the reversing sheet 88, the return member 90 could release its elastic potential energy to drive the reversing sheet 88 to rotate along a first rotating direction W1 as shown in FIG. 20 until the first side S1 of the first concave slot 881 abuts against the stop structure 921 of the stop sheet 92 if there is no external force applied to the handle device 82. At this time, the handle portion 601 could not continue to rotate along the first rotating direction W1, and then be located at a first initial position as shown in FIG. 20.

Subsequently, if the user rotates the handle portion 601 of the handle device 81 toward a second rotating direction W2 opposite to the first rotating direction W1, the reversing sheet 88 could be driven to rotate from the first initial position as shown in FIG. 20 along the second rotating direction W2 until the second side S2 of the first concave slot 881 of the reversing sheet 88 abuts against the stop structure 921 of the stop sheet 92. At this time, the handle portion 601 could not continue to rotate along the second rotating direction W2, and then be located at a first stop position as shown in FIG. 21. Subsequently, if the user releases the handle portion 601 when the handle portion 601 is located at the first stop position or the other position which is not the first initial position, the return member 90 could provide the torsion torque to the reversing sheet 88, so as to drive the reversing sheet 88 and the handle portion 601 to return back to the first initial position. Thus, the purpose that the handle portion 601 of the handle device 82 could return to the first initial position automatically could be achieved accordingly.

In summary, when the stop structure 921 protrudes from the first concave slot 881, rotary of the handle portion 601 is constrained by the first side S1 and the second side S2 of the first concave slot 881 so that the handle portion 601 could only rotate between the first initial position as shown in FIG. 20 and the first stop position as shown in FIG. 21. Accordingly, the handle portion 601 could be in the first orientation status. In this embodiment, the first orientation status could be a rightward orientation status for a right-handed user.

Figure 23:
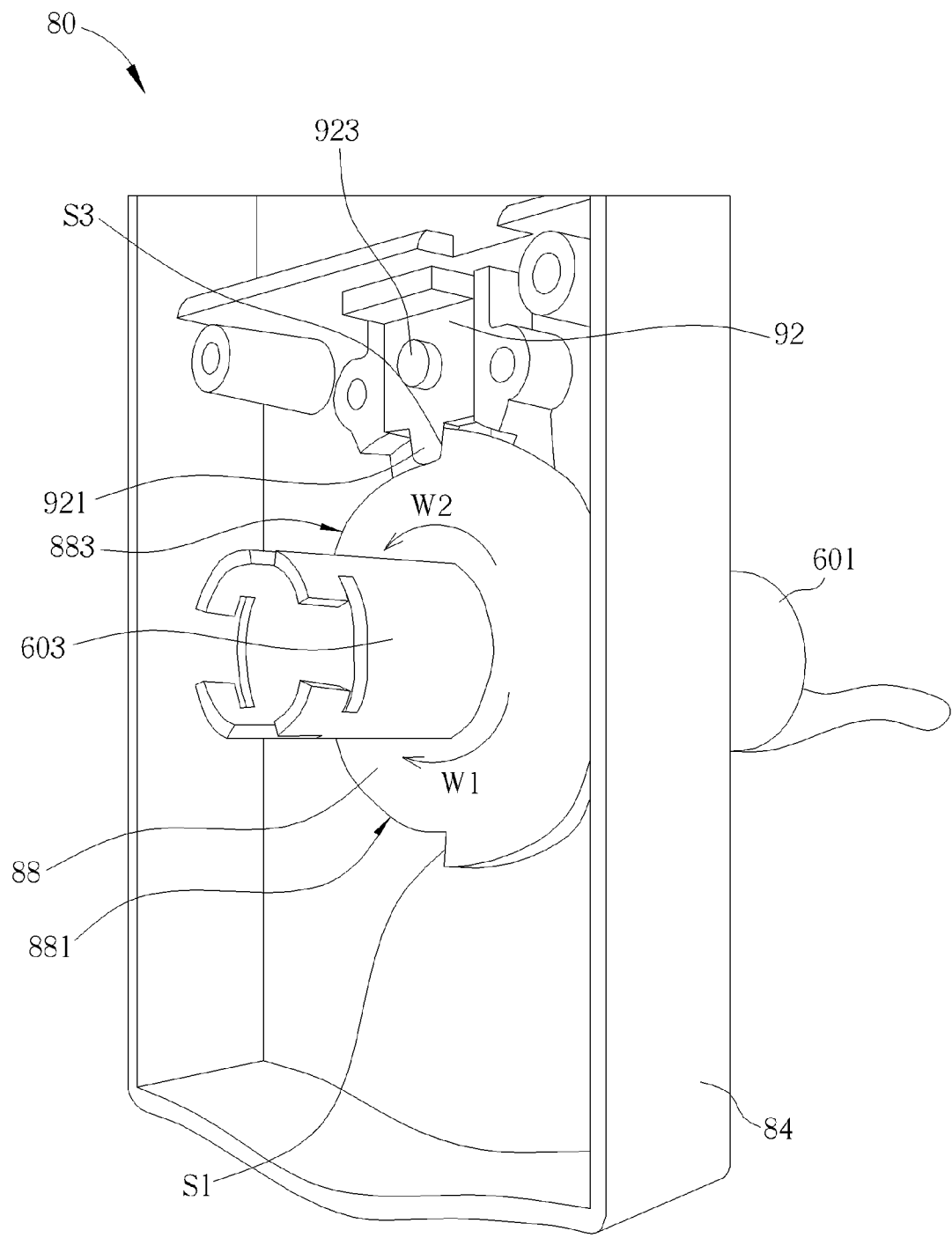
FIG. 23 is an inner diagram of the handle device being in another status according to another embodiment of the present invention.
Figure 24:
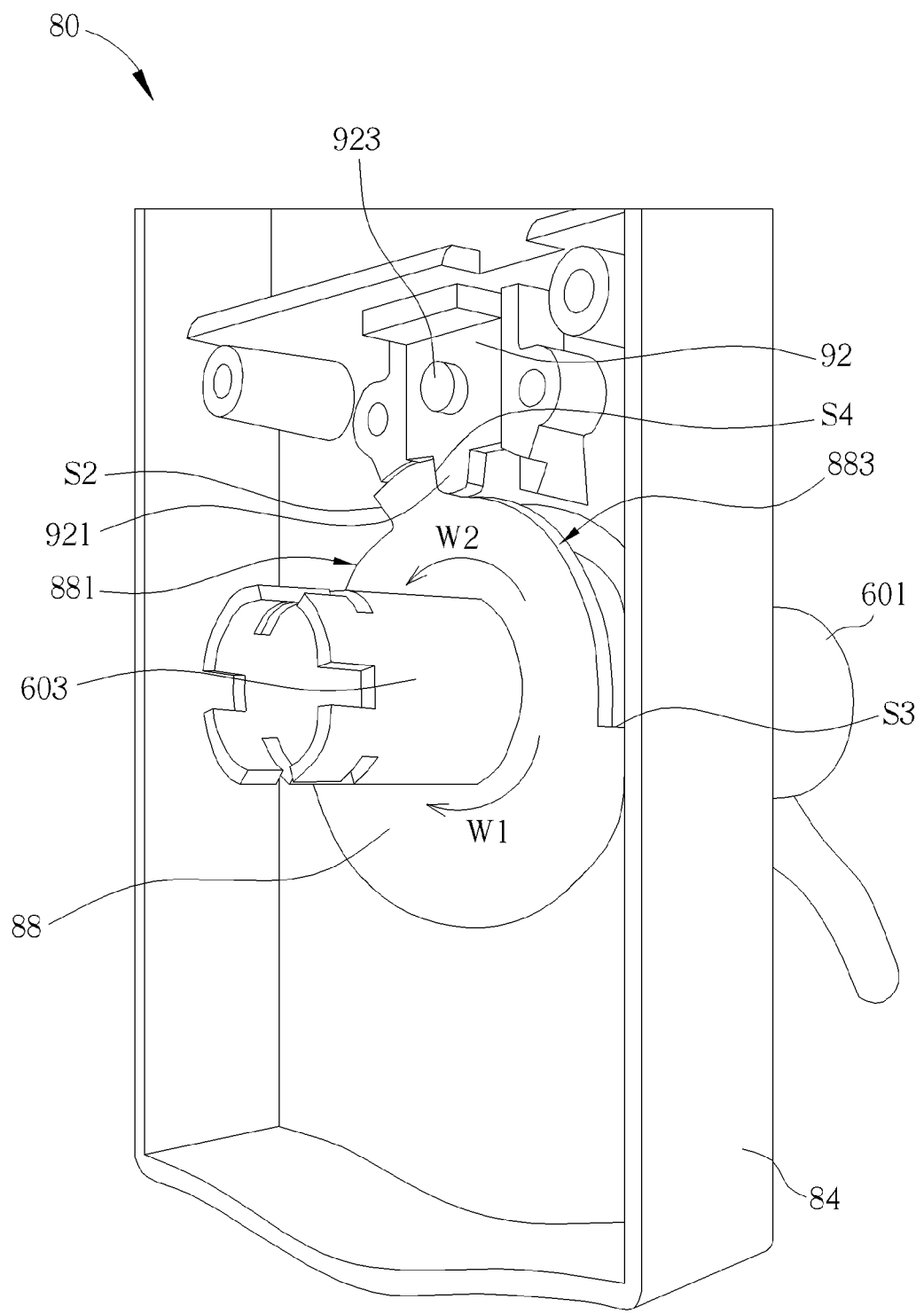
FIG. 24 is an inner diagram of the handle device being in another status according to another embodiment of the present invention.

Please refer to FIGS. 20-24. FIG. 23 is an inner diagram of the handle device 82 being in another status according to another embodiment of the present invention. FIG. 24 is an inner diagram of the handle device 82 being in another status according to another embodiment of the present invention. When the user wants to change the orientation status of the handle portion 601 of the handle device 82, the user just needs to insert a press rod 96 into the hole 861 of the fixing member 86 (as shown in FIG. 19). At this time, the protruding point 923 of the stop sheet 92 could be pushed by the press rod 96 so as to drive the stop sheet 92 to move toward the handle portion 601. Accordingly, the stop structure 921 of the stop sheet 92 could be disengaged from the first concave slot 881 of the reversing sheet 88 (as shown in FIG. 22). At this time, the handle portion 601 could rotate freely since the handle portion 601 is no longer constrained by the stop structure 921 of the stop sheet 92, so that the user could change the orientation status of the handle portion 601. During the aforesaid process, the stop sheet 92 could simultaneously compress the elastic member 94 to store an elastic potential energy in the elastic member 94. Accordingly, the handle portion 601 and the reversing sheet 88 of the handle device 82 could rotate from the first initial position as shown in FIG. 20 along the first rotating direction W1.

Subsequently, the user could rotate the handle portion 601 of the handle device 82 to drive the reversing sheet 88 to rotate along the first rotating direction W1 until the third side S3 of the second concave slot 883 of the reversing sheet 88 is rotated to a second initial position as shown in FIG. 23 so as to detach the press rod 96 from the hole 861 of the fixing member 86. At this time, the elastic potential energy stored in the elastic member 94 could be released to generate an elastic force. Accordingly, the elastic member 94 could drive the stop sheet 92 to return back to its original position, meaning that the stop sheet 92 could be driven to move into the second concave slot 883 along the direction parallel to the long axis X of the handle portion 601. It should be mentioned that the fixing member 86 could be used for stopping the stop sheet 92 during the stop sheet 92 returns back to its original position, so as to avoid the stop sheet 92 to be detached from the second concave slot 883.

When the stop sheet 92 is located in the second concave slot 883, the stop structure 921 of the stop sheet 92 abuts against the third side S3 of the second concave slot 883 (as shown in FIG. 23). As a result, the handle portion 601 could not rotate along the second rotating direction W2. Accordingly, the handle portion 601 could be located at the second initial position as shown in FIG. 23. At this time, if the user rotates the handle portion 601 of the handle device 82 toward the first rotating direction W1, the reversing sheet 88 could be driven accordingly to rotate from the second initial position as shown in FIG. 23 along the first rotating direction W1 until the fourth side S4 of the second concave slot 883 of the reversing sheet 88 abuts against the stop structure 921 of the stop sheet 92. At this time, since the stop structure 921 of the stop sheet 92 abuts against the fourth side S4 of the second concave slot 883, the handle portion 601 could not continue to rotate along the first rotating direction W1. Accordingly, the handle portion 601 could be located at a second stop position as shown in FIG. 24. Subsequently, if the user releases the handle portion 601 when the handle portion 601 is located at the second stop position or the other position which is not the second initial position, the return member 90 could provide the torsion torque to the reversing sheet 88, so as to drive the reversing sheet 88 and the handle portion 601 to return back to the second initial position. Thus, the purpose that the handle portion 601 of the handle device 82 could return back to the second initial position automatically could be achieved accordingly.

In summary, when the stop structure 921 protrudes from the second concave slot 883, rotary of the handle portion 601 is constrained by the third side S3 and the fourth side S4 of the second concave slot 883 so that the handle portion 601 could only rotate between the second initial position as shown in FIG. 23 and the second stop position as shown in FIG. 24. Accordingly, the handle portion 601 could be in the second orientation status. In this embodiment, the second orientation status could be a leftward orientation status for a left-handed user.

When the user wants to change the handle portion 601 from the second orientation status to the first orientation status, the user just needs to insert the press rod 96 into the hole 861 of the fixing member 86. At this time, the protruding point 923 of the stop sheet 92 could be pushed by the press rod 96, so as to drive the stop sheet 92 to be disengaged from the second concave slot 883 of the reversing sheet 83 and compress the elastic member 94. Accordingly, the stop structure 921 of the stop sheet 92 could be disengaged from the first concave slot 881 of the reversing sheet 88 (as shown in FIG. 22). Accordingly, the handle portion 601 and the reversing sheet 88 of the handle device 82 could rotate from the second initial position as shown in FIG. 23 along the second rotating direction W2. Subsequently, the user could rotate the handle portion 601 of the handle device 82 to drive the reversing sheet 88 to rotate along the second rotating direction W2 until the first side S1 of the first concave slot 881 of the reversing sheet 88 is rotated to the first initial position as shown in FIG. 20 so as to detach the press rod 96 from the hole 861 of the fixing member 86. At this time, the elastic potential energy stored in the elastic member 94 could be released to generate an elastic force. Accordingly, the elastic member 94 could drive the stop sheet 92 to return back to its original position, meaning that the stop sheet 92 could be driven to move into the first concave slot 881 along the direction parallel to the long axis X of the handle portion 601. It should be mentioned that the fixing member 86 could be used for stopping the stop sheet 92 during the stop sheet 92 returns back to its original position, so as to avoid the stop sheet 92 to be detached from the first concave slot 881.

Figure 25:
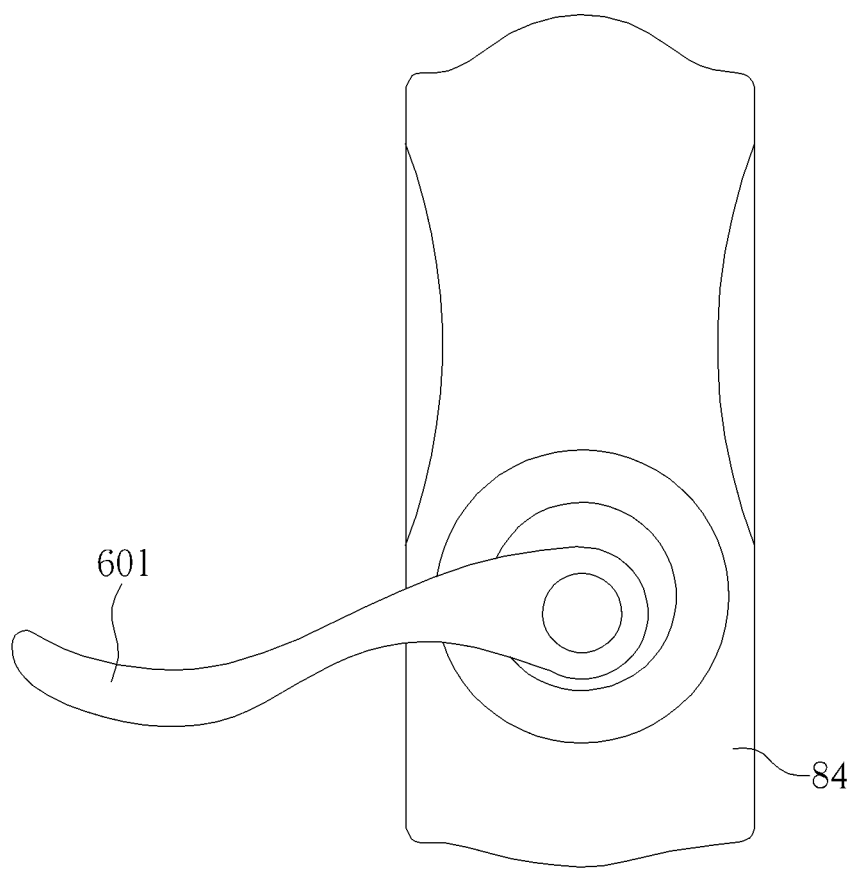
FIG. 25 is a diagram of a handle portion being located at a first initial position at another viewing angle according to another embodiment of the present invention.
Figure 26:
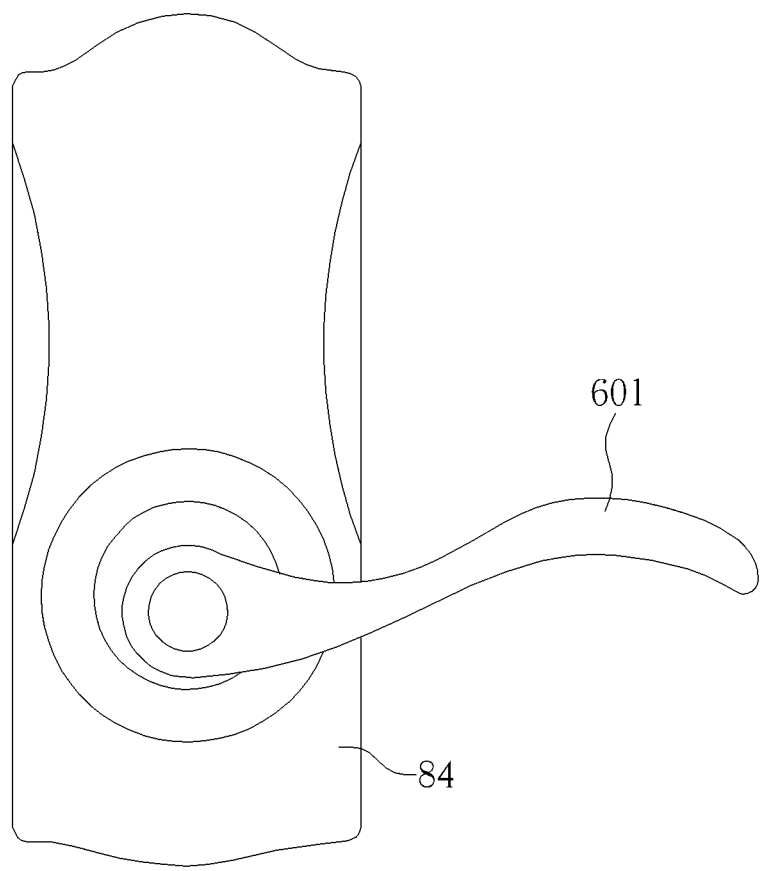
FIG. 26 is a diagram of the handle portion being located at a second initial position at another viewing angle according to another embodiment of the present invention.
Figure 27:
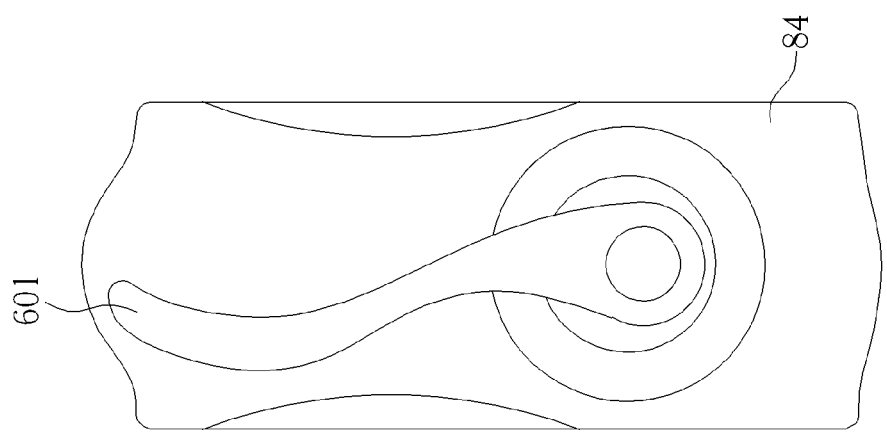
FIG. 27 is a diagram of the handle portion being located at an initial position according to another embodiment of the present invention.

In this embodiment, the return member 90 could be preferably a torsion spring. Please refer to FIGS. 25-27. FIG. 25 is a diagram of the handle portion 601 being located at the first initial position at another viewing angle according to another embodiment of the present invention. FIG. 26 is a diagram of the handle portion 601 being located at the second initial position at another viewing angle according to another embodiment of the present invention. FIG. 27 is a diagram of the handle portion 601 being located at an initial position according to another embodiment of the present invention. To be noted, when the handle portion 601 is located at the initial position, the torsion spring is in an initial status, meaning that the torsion spring has not deformed yet. In practical application, the initial position is substantially perpendicular to the first initial position and the second initial position. In summary, no matter the handle portion 601 is in the first orientation status or the second orientation status, the torsion spring has been deformed relative to the initial position. Accordingly, an elastic potential energy could be stored in the torsion spring no matter the handle portion 601 is in the first orientation status or the second orientation status. Thus, when the handle portion 601 is released from the first initial position or the first stop position in the first orientation status or the handle portion 601 is released from the second initial position or the second stop position in the second orientation status, the elastic potential energy stored in the torsion spring could be released to generate an elastic force, so as to drive the handle portion 601 to move toward the initial position. In brief, the torsion spring could drive the handle portion 601 to return back to the first initial position or the second initial position.

Compared with the prior art, when the electro-actuating member (e.g. a motor) drives the pushing member to rotate toward the first direction, the second pushed structure on the pushing member cooperates with the first pushed structure on the bottom board, so that the pushing member is pushed to move relative to the bottom board. In such a manner, by design that the first pushed structure and the second pushed structure for driving the clutch member are respectively disposed on the bottom board and the pushing member, the present invention can reduce structural complexity of the pushing member, so as to facilitate assembly, In addition, when the electro-actuating member drives the pushing member, the present invention utilizes the bottom board to provide a reaction force required to push the clutch member. Since the bottom board can be fixed on a door, the present invention can reduce wearing by increasingly improve stability of mechanism when functioning. As a result, it enhances life of the electro-mechanical lock and thus advantages the electro-mechanical lock in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission mechanism adapted to an electro-mechanical lock and for driving a latch assembly to be unlocked, the transmission mechanism comprising:
    a bottom board comprising at least one first pushed structure, wherein the at least one first pushed structure is an inclined-surface structure protruding from a surface of the bottom board;
    a pushing member comprising at least one second pushed structure, wherein the at least one second pushed structure is an inclined-surface structure sunken from a surface of the pushing member, such that a constraining concave corresponding to the at least one pushed structure is formed on the pushing member and accommodates the at least one first pushed structure;
    a clutch member abutting against the pushing member; and
    an electro-actuating member for driving the pushing member to rotate toward a first direction, the at least one second pushed structure cooperating with and displacing relative to the at least one first pushed structure to move the pushing member relative to the bottom board, so that the clutch member is pushed with movement of the pushing member to an unlocked position, wherein the constraining concave constrains displacement of the at least one first pushed structure relative to the at least one second pushed structure and the movement of the pushing member to the unlocked position.

2. The transmission mechanism of claim 1, further comprising:
    a driving cam connected to the latch assembly, the driving cam engaging with the clutch member when the clutch member is pushed with the movement of the pushing member to the unlocked position, so that the clutch member drives the driving and the latch assembly to be in an unlocked status.

3. The transmission mechanism of claim 2, further comprising:
an elastic member disposed between the clutch member and the driving cam, the elastic member driving the clutch member to move from the unlocked position when the electro-actuating member drives the pushing member to rotate toward a second direction opposite to the first direction, so that the clutch member disengages from the driving cam.

4. The transmission mechanism of claim 1, wherein the pushing member comprises a pushing portion and a transmission gear portion, and the at least one second pushed structure of the pushing member is formed on the pushing portion.

5. The transmission mechanism of claim 1, further comprising a contact switch, the pushing member further comprising a third pushed structure, and the electro-actuating member activating when the contact switch contacts the third pushed structure.

6. The transmission mechanism of claim 5, wherein the third pushed structure of the pushing member comprises a stop end and a reverse end, the electro-actuating member drives the pushing member to rotate toward a second direction opposite to the first direction when the electro-actuating member drives the pushing member to rotate toward the first direction to a position where the contact switch contacts with the reverse end, and the electro-actuating member stops when the electro-actuating member drives the pushing member to rotate toward the second direction to a position where the contact switch contacts with the stop end.

7. An electro-mechanical lock fixed on a door, comprising:
a transmission mechanism, comprising:
a bottom board screwed onto the door, the bottom board comprising at least one first pushed structure, wherein the at least one first pushed structure is an inclined-surface structure protruding from a surface of the bottom board;
a pushing member abutting against the bottom board and movable relative to the bottom board, the pushing member comprising at least one second pushed structure, wherein the at least one second pushed structure is an inclined-surface structure sunken from a surface of the pushing member, such that a constraining concave corresponding to the at least one first pushed structure is formed on the pushing member and accommodates the at least one first pushed structure;
a clutch member abutting against the pushing member; and
an electro-actuating member for driving the pushing member to rotate toward a first direction, the at least one second pushed structure cooperating with and displacing relative to the at least one first pushed structure to move the pushing member relative to the bottom board, so that the clutch member is pushed with movement of the pushing member to an unlocked position, wherein the constraining concave constrains displacement of the at least one first pushed structure relative to the at least one second pushed structure and the movement of the pushing structure to the unlocked position; and
a handle device rotable relative to a long axis, the pushing member moving to the unlocked position along a first movement direction of the long axis far away from the bottom board when the pushing member pushes the bottom board, so that the handle device transmits a torsion force, and the pushing member moves from the unlocked position along a second movement direction of the long axis close to the bottom board when the pushing member does not push the bottom board, so that the handle device cannot transmit the torsion force.

8. The electro-mechanical lock of claim 7, wherein the transmission mechanism further comprises:
a driving cam detachably engaging with the clutch member; and
a latch assembly connected to the driving cam;
wherein the driving cam engages with the clutch member when the clutch member is pushed with movement of the pushing member to the unlocked position along the first movement direction, so that the handle device transmits the torsion torque to the latch assembly to drive the latch assembly to be in an unlocked status, and the clutch member disengages with the driving cam when the clutch member moves from the unlocked position, so that the handle device does not transmit the torsion torque to the latch assembly.

9. The electro-mechanical lock of claim 8, wherein the transmission mechanism further comprises a contact switch, the pushing member further comprises a third pushed structure, and the electro-actuating member activates when the contact switch contacts the third pushed structure.

10. The electro-mechanical lock of claim 9, wherein the third pushed structure of the pushing member comprises a stop end and a reverse end, the electro-actuating member drives the pushing member to rotate toward a second direction opposite to the first direction when the electro-actuating member drives the pushing member to rotate toward the first direction to a position where the contact switch contacts with the reverse end, and the electro-actuating member stops when the electro-actuating member drives the pushing member to rotate toward the second direction to a position where the contact switch contacts with the stop end.

11. The electro-mechanical lock of claim 8, further comprising:
an input unit for inputting a signal; and
a control unit coupled to the input unit and the electro-actuating member, the control unit being for controlling the electro-actuating member to activate when the signal conforms to an authorized signal.

12. The electro-mechanical lock of claim 11, further comprising:
an unlocking member coupled to the control unit, the control unit controlling whether to activate the electro-actuating member to push the clutch member to the unlocked position according to a position of the unlocking member.

13. The electro-mechanical lock of claim 7, wherein the pushing member comprises a pushing portion and a transmission gear portion, and the at least one second pushed structure of the pushing member is formed on the pushing portion.

14. The electro-mechanical lock of claim 13, wherein the handle device comprises:
a handle portion; and
a tube portion connected to the handle portion and passing through the bottom board, the clutch member slidably passing through an end of the tube portion.

15. The electro-mechanical lock of claim 14, wherein the latch assembly comprises:
a latch for engaging with a wall; and
a driving spindle connected to the driving cam and the latch, the clutch member engaging with the driving cam when the clutch is pushed with the movement of the pushing member along the tube portion to the unlocked position, so as to drive the driving spindle and the latch to rotate to be in the unlocked status, the driving cam being installed on the driving spindle, and the driving spindle being not linked with the tube portion.

16. The electro-mechanical lock of claim 7, wherein the transmission mechanism further comprises:
an elastic member disposed between the clutch member and the driving cam, the elastic member driving the clutch member to move from the unlocked position in the second movement direction when the electro-actuating member drives the pushing member to rotate toward a second direction opposite to the first direction, so that the clutch member disengages from the driving cam.

* * * * *